United States Patent
Kamada

(10) Patent No.: US 10,184,640 B2
(45) Date of Patent: Jan. 22, 2019

(54) LIGHTING DEVICE, DISPLAY DEVICE, AND TELEVISION DEVICE

(71) Applicant: Sharp Kabushiki Kaisha, Sakai, Osaka (JP)

(72) Inventor: Kentaro Kamada, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/554,463

(22) PCT Filed: Mar. 4, 2016

(86) PCT No.: PCT/JP2016/056711
§ 371 (c)(1),
(2) Date: Aug. 30, 2017

(87) PCT Pub. No.: WO2016/143682
PCT Pub. Date: Sep. 15, 2016

(65) Prior Publication Data
US 2018/0045395 A1     Feb. 15, 2018

(30) Foreign Application Priority Data

Mar. 10, 2015   (JP) ................................ 2015-046883

(51) Int. Cl.
*F21V 9/30*     (2018.01)
*F21K 9/61*     (2016.01)
(Continued)

(52) U.S. Cl.
CPC .................. *F21V 9/30* (2018.02); *F21K 9/61* (2016.08); *F21K 9/64* (2016.08); *F21S 2/00* (2013.01);
(Continued)

(58) Field of Classification Search
CPC ........... F21Y 2115/10; G02F 1/133603; G02F 1/133608; F21V 9/16; F21V 9/61; F21V 9/64

See application file for complete search history.

(56) References Cited

U.S. PATENT DOCUMENTS

2010/0167011 A1   7/2010 Dubrow
2010/0187975 A1   7/2010 Tsukahara et al.
(Continued)

FOREIGN PATENT DOCUMENTS

CN     104154468 A    11/2014
JP     2009-283438 A  12/2009
(Continued)

OTHER PUBLICATIONS

Official Communication issued in International Patent Application No. PCT/JP2016/056711, dated May 31, 2016.

*Primary Examiner* — Laura Gudorf
(74) *Attorney, Agent, or Firm* — Keating & Bennett, LLP

(57) ABSTRACT

A lighting device includes LEDs (a light source) 17, a wavelength conversion sheet (a wavelength conversion member) 20 containing phosphors for converting light emitted by the LEDs 17 with wavelength conversion, and a diffuser plate 15a that exerts diffusing effects on the light from the LEDs 17 and is thicker than the wavelength conversion sheet 20 and disposed on a light exit side with respect to the wavelength conversion sheet 20.

12 Claims, 15 Drawing Sheets

(51) Int. Cl.
  *F21K 9/64* (2016.01)
  *G02F 1/1335* (2006.01)
  *F21S 2/00* (2016.01)
  *F21Y 115/10* (2016.01)

(52) U.S. Cl.
  CPC ..... *G02F 1/133603* (2013.01); *F21Y 2115/10* (2016.08); *G02F 1/133608* (2013.01); *G02F 2001/133613* (2013.01)

(56) References Cited

U.S. PATENT DOCUMENTS

| | | |
|---|---|---|
| 2010/0246160 A1 | 9/2010 | Ito et al. |
| 2010/0265167 A1 | 10/2010 | Kinoshita |
| 2011/0205727 A1* | 8/2011 | Kim .................... G02B 6/0023 362/84 |
| 2011/0285923 A1 | 11/2011 | Yokota |
| 2012/0113672 A1 | 5/2012 | Dubrow et al. |
| 2013/0075014 A1 | 3/2013 | Dubrow |
| 2014/0178648 A1 | 6/2014 | Dubrow |
| 2015/0300600 A1 | 10/2015 | Dubrow et al. |
| 2016/0009988 A1 | 1/2016 | Dubrow |
| 2016/0349428 A1 | 12/2016 | Dubrow et al. |
| 2016/0363713 A1 | 12/2016 | Dubrow et al. |
| 2017/0168351 A1 | 6/2017 | Qiu et al. |

FOREIGN PATENT DOCUMENTS

| | | |
|---|---|---|
| JP | 2010-257603 A | 11/2010 |
| JP | 2013-544018 A | 12/2013 |
| WO | 2010/089929 A1 | 8/2010 |
| WO | 2015/030036 A1 | 3/2015 |

\* cited by examiner

LIGHTING DEVICE, DISPLAY DEVICE, AND TELEVISION DEVICE

TECHNICAL FIELD

The present invention relates to a lighting device, a display device, and a television device.

BACKGROUND ART

An example of a liquid crystal display device is disclosed in Patent Document 1. The liquid crystal display device disclosed in Patent Document 1 includes a liquid crystal panel, and a display backlight unit that supplies light to the liquid crystal panel. The display backlight unit includes a primary light source, a light guide plate that guides primary light emitted by the primary light source, and a remote phosphor film containing QD phosphor material that is excited by the primary light traveling through a light guide plate and outputs secondary light.

RELATED ART DOCUMENT

Patent Document

Patent Document 1: Japanese Translation of PCT International Application Publication No. 2013-544013

Problem to be Solved by the Invention

The remote phosphor film described in Patent Document 1 includes a barrier layer formed from metal oxide films to protect the QD phosphor material from deterioration due to absorption of moisture (water). However, an outer peripheral edge portion of the remote phosphor film is likely to be exposed to moisture or water included in outer air. Therefore, the outer peripheral edge portion of the remote phosphor film may be likely to be deteriorated locally due to the absorption of moisture and this may cause unevenness in color.

DISCLOSURE OF THE PRESENT INVENTION

An object of the present invention is to reduce occurrence of unevenness in color.

Means for Solving the Problem

To solve the above problem, a lighting device includes a light source, a wavelength conversion member containing phosphors that convert light from the light source with wavelength conversion, and a diffuser plate that exerts diffusing effects on the light from the light source, the diffuser plate being thicker than the wavelength conversion member and disposed on a light exit side with respect to the wavelength conversion member.

According to such a configuration, the diffusing effects are exerted on the light rays emitted by the light source by the diffuser plate and wavelength conversion is performed on the light rays from the light source by the phosphors contained in the wavelength conversion member. The diffuser plate is thicker than the wavelength conversion member and has high flatness, and accordingly, the light rays from the light source are evenly dispersed within a plate surface area of the diffuser plate. The diffuser plate is disposed on the light exit side with respect to the wavelength conversion member. According to such a configuration, even if the phosphors are deteriorated due to moisture absorption at the outer peripheral portion of the wavelength conversion member and the difference in tint is caused between the tint of light rays transmitted through the outer peripheral portion of the wavelength conversion member and the tint of light rays transmitted through the middle portion thereof, the diffusing effects are exerted on the transmitted light rays by the diffuser plate and the light rays exits the device. Therefore, the difference in tint is less likely to be caused in the exit light rays exiting the middle portion and those exiting the outer peripheral portion and unevenness in color is less likely to be caused.

Following configurations may be preferable.

(1) The wavelength conversion member may be bonded on a plate surface of the diffuser plate on an opposite side from the light exit side. According to such a configuration, flatness of the wavelength conversion member is ensured by the diffuser plate.

(2) The lighting device may further include an adhesive layer between the wavelength conversion member and the diffuser plate. According to such a configuration, the transmitted light rays through the wavelength conversion member are reflected by the interface between the wavelength conversion member and the adhesive layer and the interface between the adhesive layer and the diffuser plate and are likely to pass through the wavelength conversion member again. Accordingly, the wavelength conversion efficiency of by the phosphors contained in the wavelength conversion member is further increased.

(3) The lighting device may further include an optical sheet being thinner than the diffuser sheet and overlapped with the diffuser plate on the light exit side. According to such a configuration, flatness of the wavelength conversion member is ensured by the diffuser plate.

(4) The diffuser plate may be disposed to cover an entire area of the wavelength conversion member from the light exit side. According to such a configuration, the diffusing effects are exerted on the transmitted light rays passing through the wavelength conversion member by the diffuser plate and unevenness in color is less likely to be caused.

(5) The wavelength conversion member may include separated wavelength conversion members each of which has an outer shape smaller than that of the diffuser plate and that are arranged within a plate surface area of the diffuser plate. Such a configuration is preferable for increasing a size of the lighting device. In the configuration in that the separated wavelength conversion members included in the wavelength conversion member are arranged within the plate surface area of the diffuser plate, the outer peripheral portion of each separated wavelength conversion member is located in the middle portion within the plate surface of the diffuser plate. However, the diffusing effects are exerted on the transmitted light rays through each of the separated wavelength conversion members by the diffuser plate that is disposed on the light exit side with respect to the separated wavelength conversion members. Accordingly, even if the difference in tint is caused between the tint of the light rays transmitted through the outer peripheral portion of each wavelength conversion member and the tint of the light rays transmitted through the middle portion thereof, the diffusing effects are exerted on the transmitted light rays by the diffuser plate and exits the diffuser plate and the unevenness in color is less likely to be caused in the exit light rays.

(6) The lighting device may further include a second diffuser plate being thicker than the wavelength conversion member and overlapped with the wavelength conversion member on an opposite side from the diffuser plate with respect to the wavelength conversion member. According to such a configuration, the wavelength conversion member is supported by the second diffuser plate from the opposite side from the diffuser plate and held between the diffuser plate and the second diffuser plate such that flatness thereof is effectively maintained. The light rays on which the diffusing effects are exerted by the second diffuser plate are subjected to the wavelength conversion through the wavelength conversion member, and therefore, the unevenness in luminance is further reduced.

(7) The wavelength conversion member may be disposed opposite a light emission surface of the light source and away from the light emission surface on the light exit side. According to such a configuration, the light rays emitted by the light source through the light emission surface are supplied toward the wavelength conversion member that is opposite the light emission surfaces. The light rays supplied to the wavelength conversion member are subjected to the wavelength conversion by the phosphors and the diffusing effects are exerted on the converted light rays by the diffuser plate and the light rays exit the diffuser plate. Compared to a configuration in that a light guide plate is between the light source and the wavelength conversion member, the light use efficiency is improved and it is preferable for increasing luminance and reducing power consumption.

(8) The lighting device may further include a light guide plate configured to guide the light from the light source, and the wavelength conversion member may be disposed opposite a light exit surface of the light guide plate. According to such a configuration, the light rays emitted by the light source enter and travel within the light guide plate and exit the light guide plate through the light exit surface. The light rays exiting through the light exit surface are subjected to the wavelength conversion by the phosphors contained in the wavelength conversion member. Thereafter, the diffusing effects are exerted on the light rays by the diffuser plate and the light rays exit the diffuser plate. Unevenness in luminance is less likely to be caused in the light rays that are supplied to the wavelength conversion member after travelling within the light guide plate. Therefore, a distance between the light guide plate and the wavelength conversion member is reduced and it is preferable for reducing a thickness of the device.

(9) The light source may be configured to emit blue light, and the wavelength conversion member may contain as the phosphors at least a green phosphor that convers the blue light into green light through wavelength conversion and a red phosphor that converts the blue light into red light through wavelength conversion, or a yellow phosphor that converts the blue light into yellow light through wavelength conversion. According to such a configuration, the blue light rays emitted by the light source are converted into the green light rays and the red light rays by the green phosphors and the red phosphors contained in the wavelength conversion member. Among the light rays transmitted through the wavelength conversion member, the light rays transmitted through the outer peripheral portion of the wavelength conversion member are likely to be tinged with blue by the deterioration of the green phosphors and the red phosphors contained in the outer peripheral portion due to the moisture absorption compared to the light rays transmitted through the middle portion. Even in such a case, the diffusing effects are exerted on the transmitted light rays through the outer peripheral portion and the transmitted light rays through the middle portion by the diffuser plate and the light rays exit the diffuser plate. Therefore, the exit light rays are less likely to be tinged with blue in the outer peripheral portion and unevenness in color is less likely to be caused.

(10) The wavelength conversion member may contain quantum dot phosphors as the phosphors. According to such a configuration, the wavelength conversion efficiency of light by the wavelength conversion member is further increased and purity of the color is higher. The quantum dot phosphors are likely to be deteriorated by the moisture absorption compared to other type of phosphors, and the wavelength conversion efficiency is likely to be lowered at the outer peripheral portion of the wavelength conversion member. However, the light rays transmitted through the wavelength conversion member are diffused through the diffuser plate and the unevenness in color is less likely to be caused.

Next, to solve the above problem, a display device includes the above lighting device and a display panel displaying images using light from the lighting device. According to the display device having such a configuration, unevenness in color of the exit light from the lighting device is less likely to be caused and display with good display quality can be achieved.

Further, to solve the above problem, a television device includes the above display device. The television device includes the display device that improves display quality and television images of good display quality can be displayed.

Advantageous Effect of the Invention

According to the present invention, unevenness in color is less likely to occur.

MODES FOR CARRYING OUT THE INVENTION

First Embodiment

Figure 1:
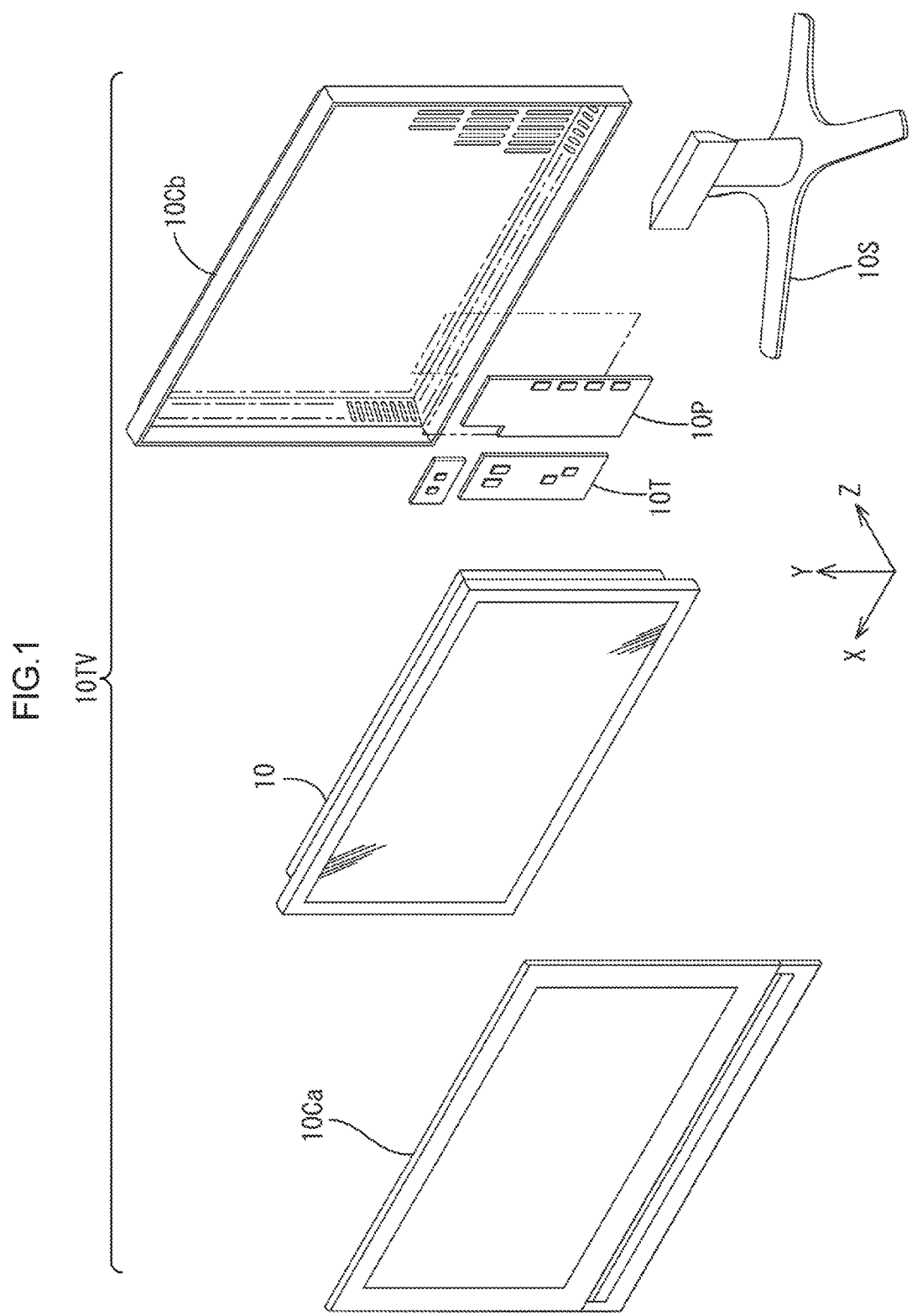
FIG. 1 is an exploded perspective view illustrating a general configuration of a television device according to a first embodiment of the present invention.

A first embodiment of the present invention will be described with reference to FIGS. 1 to 8. In this embodiment, a liquid crystal display device 10 will be described as an example. X-axis, Y-axis and Z-axis may be present in the drawings and each of the axial directions represents a direction represented in each drawing. An an upper side and a lower side in FIGS. 4 and 5 correspond to a front side and a back side, respectively.

Figure 2:
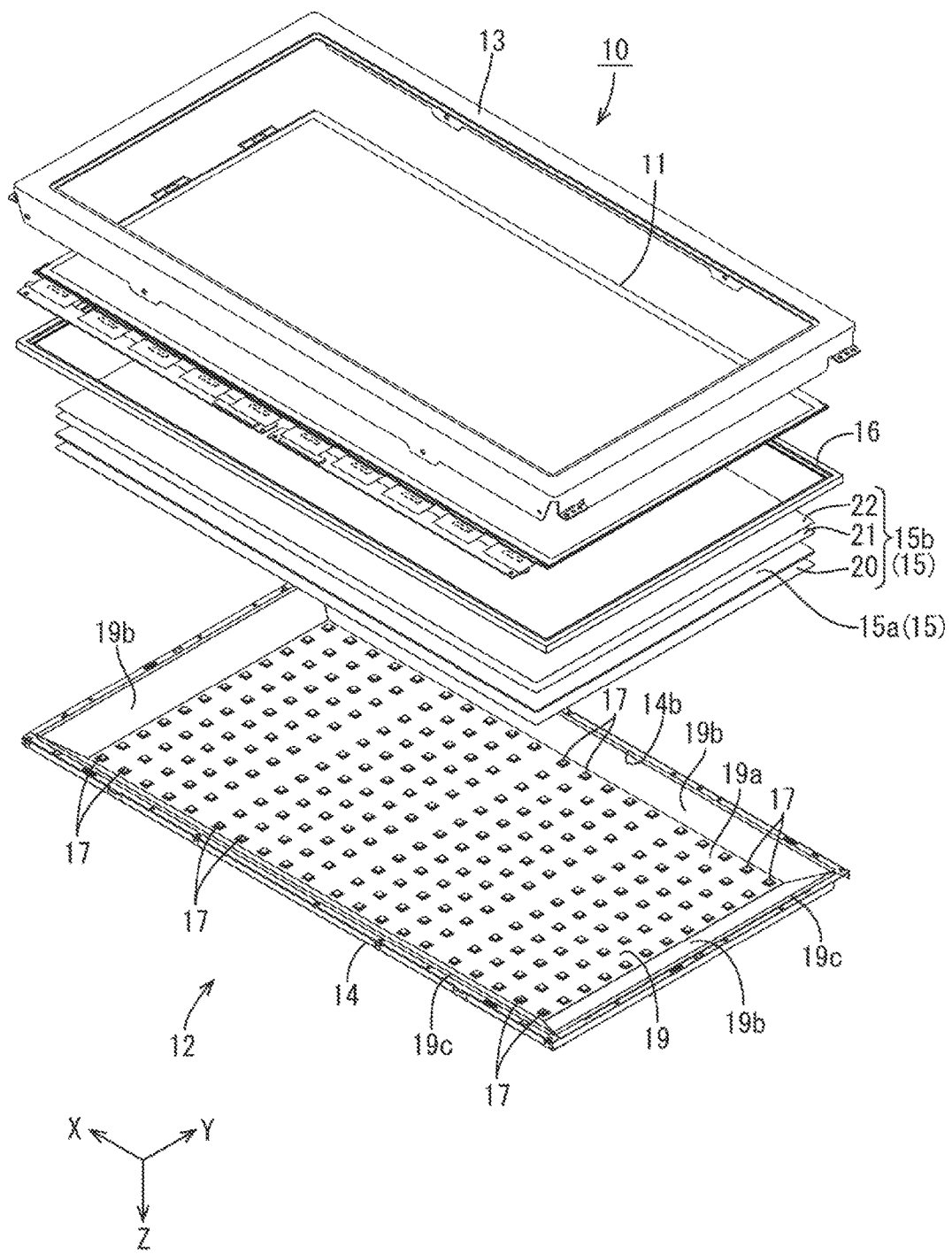
FIG. 2 is an exploded perspective view illustrating a general configuration of a liquid crystal display device included in the television device.

As illustrated in FIG. 1, a television device 10TV according to this embodiment includes a liquid crystal display device 10, front and rear cabinets 10Ca, 10Cb that sandwich and hold the liquid crystal display device 10 therebetween, a power supply 10P, a tuner (a receiving portion) 10T that receives television signals, and a stand 10S. The liquid crystal display device (a display device) 10 has a horizontal (longitudinal) square (rectangular) shape as a whole and is arranged in a vertical position. As illustrated in FIG. 2, the liquid crystal display device 10 includes a liquid crystal panel 11 that is a display panel displaying images thereon, and a backlight device (a lighting device) 12 that is an external light source supplying light to the liquid crystal panel 11 for display. The liquid crystal panel 11 and the backlight device 12 are integrally held by a frame-shaped bezel 13.

Next, the liquid crystal panel 11 and the backlight device 12 included in the liquid crystal display device 10 will be described. The liquid crystal panel (a display panel) 11 has a horizontally elongated rectangular shape in a plan view. The liquid crystal panel 11 includes a pair of glass substrates that are bonded with a predetermined gap therebetween and liquid crystals are enclosed in a space between the glass substrates. On one of the glass substrates (an array substrate, an active matrix substrate), switching components (such as TFTs) that are connected to source lines and gate lines that are perpendicular to each other, pixel electrodes that are connected to the switching components, and alignment films are disposed. On another one of the glass substrates (a counter substrate, a CF substrate), a color filter including color portions of red (R), green (G), blue (B) with certain arrangement, counter electrodes, and alignment films are disposed. Polarizing plates are attached to the outer surfaces of the respective glass substrates.

Next, the backlight device 12 will be described in detail. As illustrated in FIG. 2, the backlight device 12 includes a chassis 14, an optical member 15, and a frame 16. The chassis 14 has a substantially box-shape and has a light exit portion 14b that is open toward the front side (a light exit side, a liquid crystal panel 11 side). The light exit portion 14b of the chassis 14 is covered with the optical member 15. The frame 16 extends along an outer edge portion of the chassis 14 and holds an outer edge portion of the optical member 15 between the frame 16 and the chassis 14. LEDs (light sources) 17, an LED board 18 where the LEDs 17 are mounted, and a light reflection sheet (a light reflecting member) 19 that reflects light within the chassis 14 are arranged in the chassis 14. In the backlight device 12 according to this embodiment, the LEDs 17 are arranged within the chassis 14 directly below the liquid crystal panel 11 and the optical member 15 and light emission surfaces 17a of the LEDs 17 are opposite the liquid crystal panel 11 and the optical member 15. The backlight device 12 according to this embodiment is a so-called direct-type backlight device. Hereinafter, components of the backlight devices 12 will be described.

Figure 3:
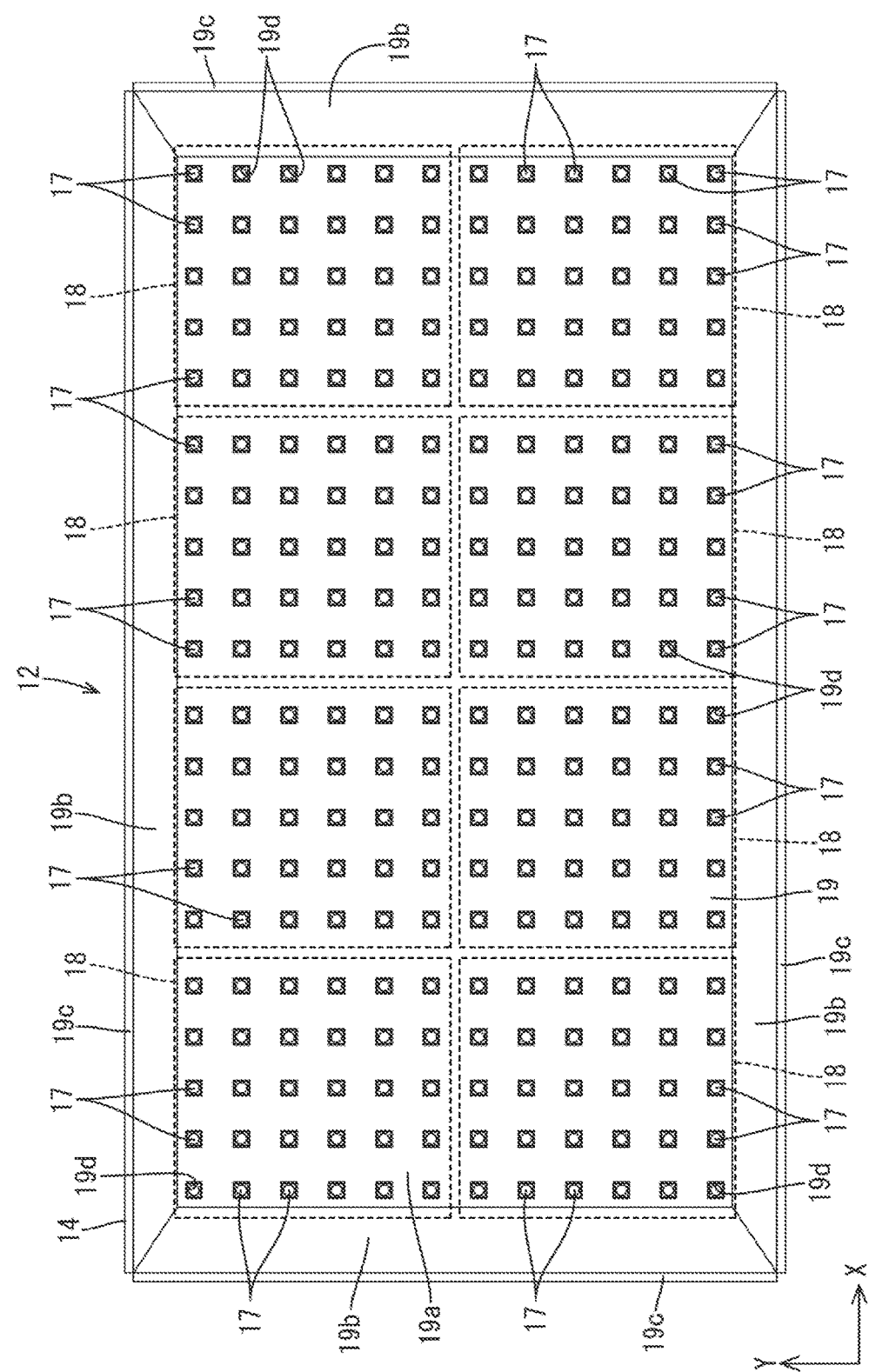
FIG. 3 is a plan view illustrating a backlight device included in the liquid crystal display device.
Figure 4:
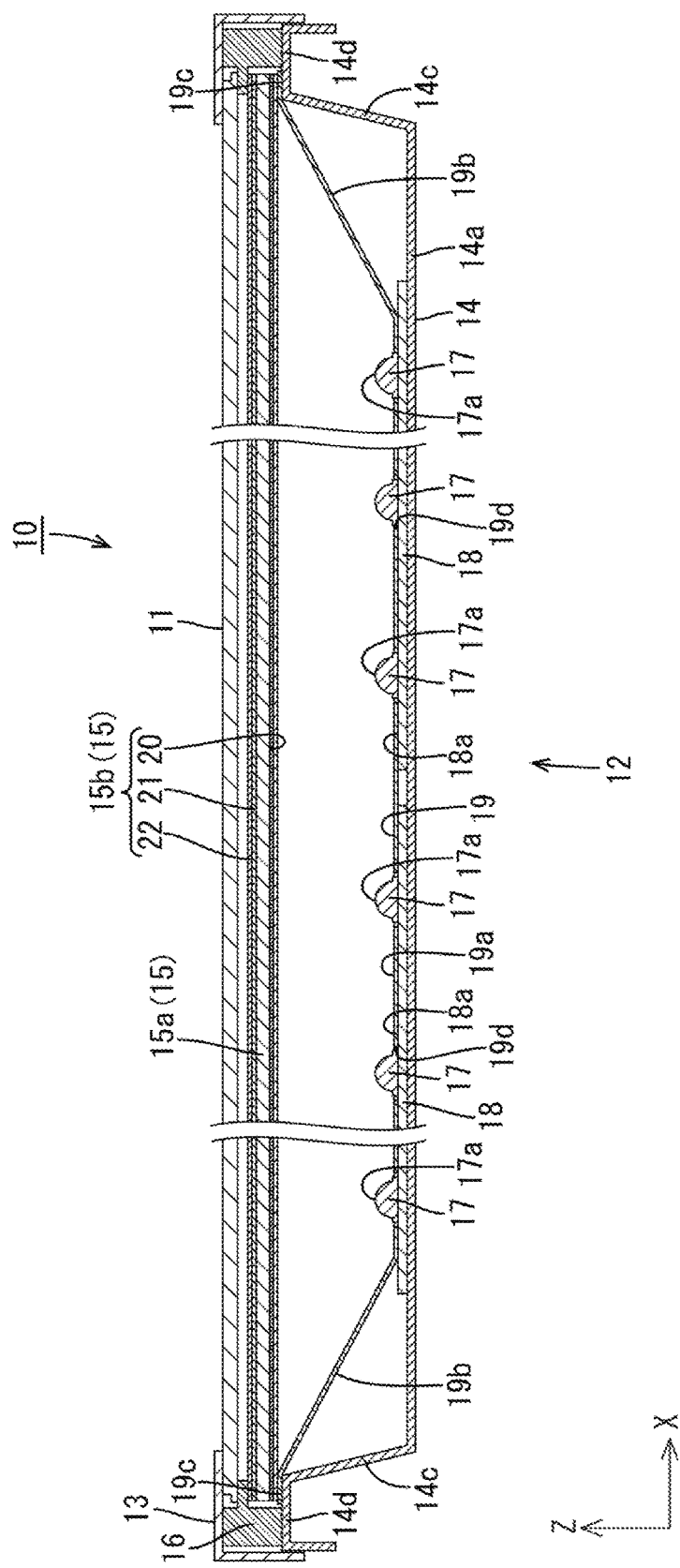
FIG. 4 is a cross-sectional view illustrating a cross-sectional configuration taken in a long-side direction of the liquid crystal display device.
Figure 5:
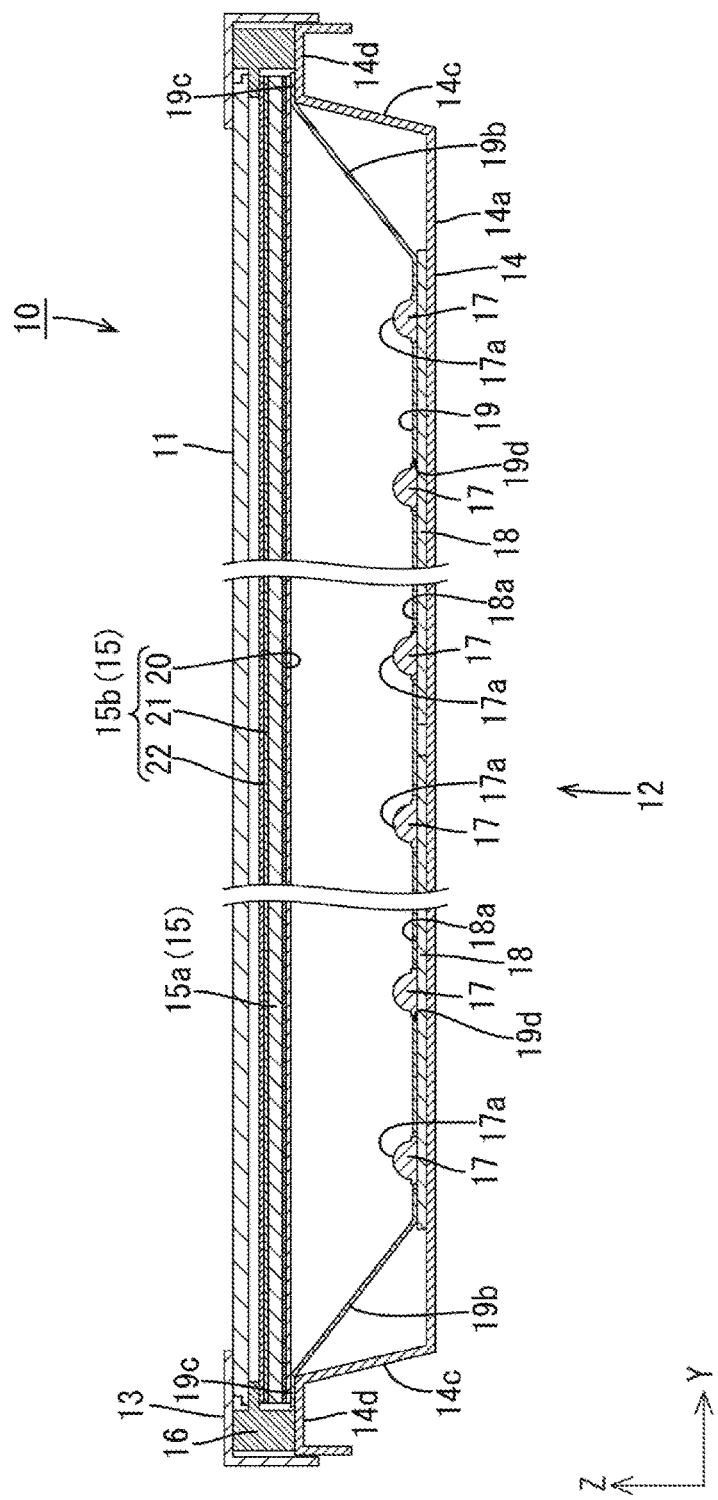
FIG. 5 is a cross-sectional view illustrating a cross-sectional configuration taken in a short-side direction of the backlight device.

The chassis 14 is made of a metal plate such as aluminum plate, or an electro-galvanized steel plate (SECC). As illustrated in FIGS. 3 to 5, the chassis 14 includes a bottom plate (a bottom portion) 14a that has an elongated rectangular plan view shape (a square, a rectangular shape) similar to the liquid crystal panel 11, side plates 14c each of which extends from an outer edge of each side (each of the long sides and each of the short sides) of the bottom plate 14a toward the front side (the light exit side), and a receiver plate (a receiver portion) 14d that extends outwardly from an extended end of each of the side plates 14c. The chassis 14 has substantially a shallow box shape (substantially shallow bowl shape) that opens frontward. In the chassis 14, a long-side direction matches the X-axis direction and a short-side direction matches the Y-axis direction. The bottom plate 14a of the chassis 14 is arranged on the back side with respect to the LED board 18, that is, on the opposite side with respect to the LEDs 17 from the light emission surface 17a side (the light exit side). Each of the side plates 14c of the chassis 14 is inclined with respect to the bottom plate 14a. The frame 16 and the optical member 15, which will be described later, can be placed on each of the receiver plates 14d of the chassis 14 from the front side. The frame 16 is fixed on each of the receiver plates 14d.

As illustrated in FIG. 2, the optical member 15 has a horizontally elongated rectangular plan view shape similar to the liquid crystal panel 11 and the chassis 14. As illustrated in FIGS. 4 and 5, an outer edge portion of the optical member 15 is placed on the receiver plate 14d such that the optical member 15 covers the light exit portion 14b of the chassis 14 and is between the liquid crystal panel 11 and the LEDs 17. The optical member 15 is opposite the light emission surfaces 17a of the LEDs 17 on the front side thereof and is opposite the LEDs 17 on the light exit side with a certain distance therebetween. The optical member 15 includes a relatively thick diffuser plate 15a and relatively thin optical sheets 15b. The diffuser plate 15a includes a substantially transparent resin substrate having a thickness greater than that of the optical sheet 15b and diffuser particles dispersed in the resin substrate. The diffuser plate 15a is configured to diffuse light transmitted therethrough. The diffuser plate 15a has a greater thickness and much greater rigidity than the optical sheet 15b. Therefore, the diffuser plate 15a has high flatness and can disperse light rays emitted by the LEDs 17 evenly within a plate surface thereof. The optical sheet 15b is a sheet that is thinner than the diffuser plate 15a and includes three sheets layered on each other. Specifically, the optical sheet 15b includes a wavelength conversion sheet (a wavelength conversion member) 20, a prism sheet 21, and a reflective-type polarizing sheet 22. The wavelength conversion sheet 20 converts light emitted by the LEDs 17 (primary light) into light having another wavelength. The prism sheet 21 exerts light collecting effects on the light. The reflective-type polarizing sheet 22 reflects light with polarizing. The wavelength conversion sheet 20 will be described in detail later.

The prism sheet 21 includes a substrate and a prism portion included on a front-side plate surface of the substrate. The prism portion includes unit prisms each of which extends in the X-axis direction and that are arranged in the Y-axis direction. According to such a configuration, light collecting effects are selectively exerted on the light rays with respect to the Y-axis direction by the prism sheet 21 (anisotropic light collecting effects). The reflective-type polarizing sheet 22 includes a reflective-type polarizing film that reflects light rays with polarizing, and a pair of diffuser films that sandwich the reflective-type polarizing film from the front and rear sides. The reflective-type polarizing film has a multi-layer structure including layers having different refractive index layered on each other. Among the light rays exiting the prism sheet 21, p-wave is passed through the reflective-type polarizing film and s-wave is reflected by the reflective-type polarizing film to the rear side. The s-wave reflected by the reflective-type polarizing film reflects off a reflection sheet 19, which will be described later, again to the front side and separated into s-wave and p-wave. Thus, the reflective-type polarizing sheet 22 reflects the s-wave that is to be absorbed by the polarizing plate of the liquid crystal panel 11 if not including the reflective-type polarizing film. The reflective-type polarizing sheet 22 reflects the s-wave to the rear side (toward the reflection sheet 19) and the reflected s-wave can be reused and light use efficiency (brightness) can be improved. The pair of diffuser films are made of synthetic resin such as polycarbonate and are subjected to embossing processing on plate surfaces thereof opposite from the surfaces facing the reflective-type polarizing film. The embossed surfaces provide light with diffusing effects.

As illustrated in FIG. 2, the frame 16 extends along outer peripheral edges of the liquid crystal panel 11 and the optical member 15. The frame 16 and each receiver plate 14d hold the outer peripheral edge portion of the optical member 15 therebetween (FIGS. 4 and 5). The frame 16 receives the outer peripheral edge portion of the liquid crystal panel 11 from the rear side and the outer peripheral edge portion of the liquid crystal panel 11 is held between the frame 16 and the bezel 13 that is arranged on the front side of the frame 16 (FIGS. 4 and 5).

Figure 6:
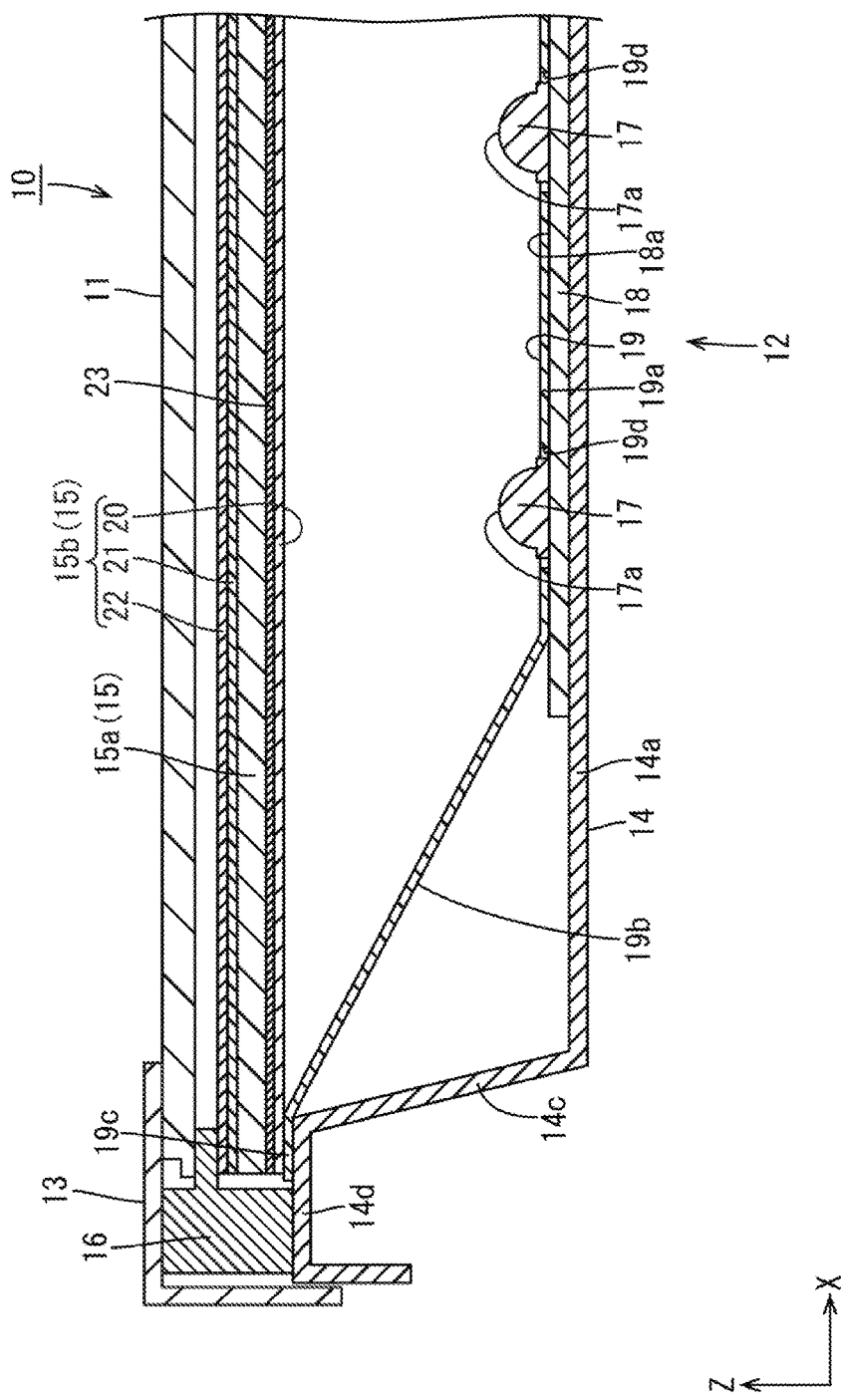
FIG. 6 is a magnified cross-sectional view illustrating an edge-side portion in FIG. 4.
Figure 7:
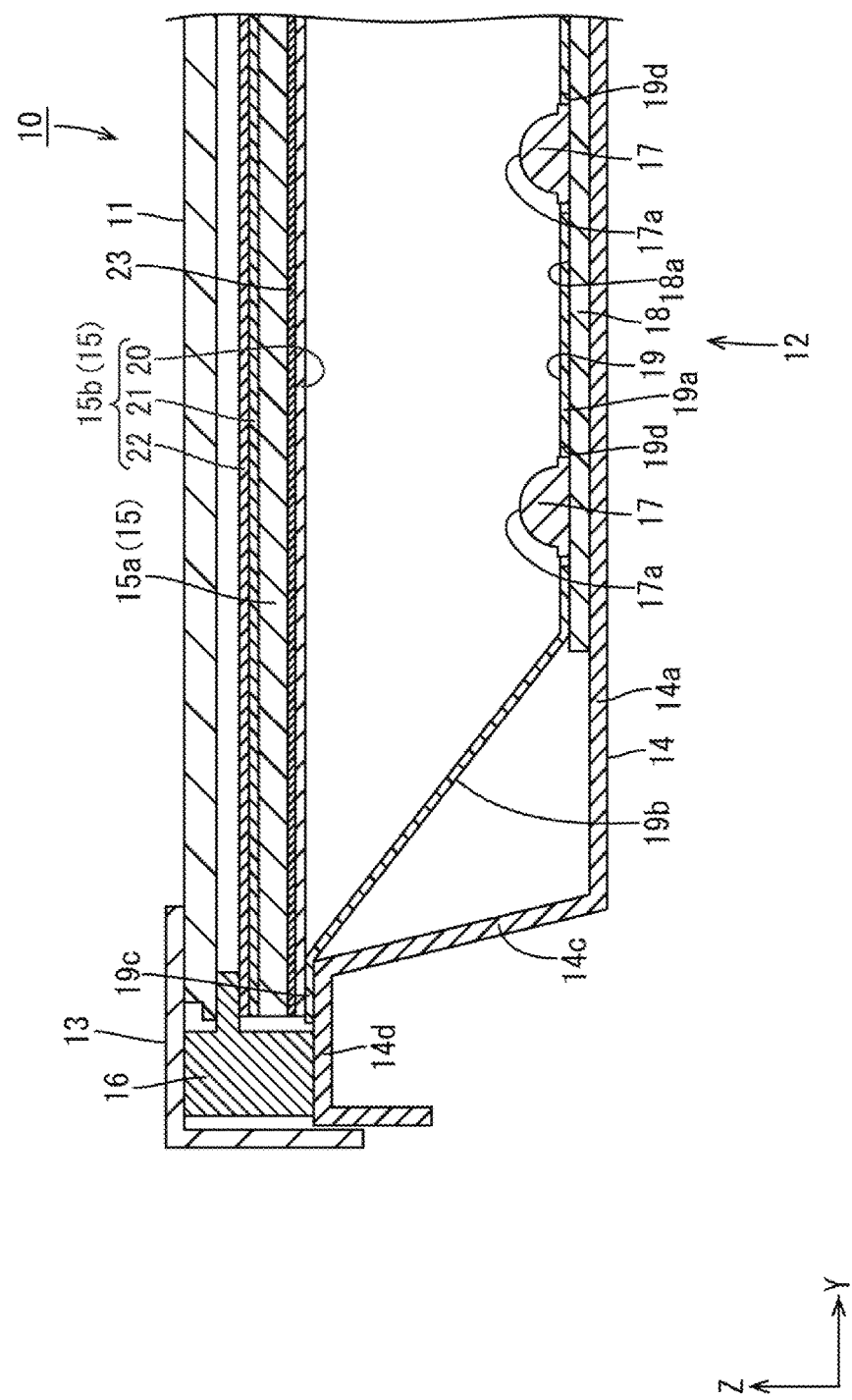
FIG. 7 is a magnified cross-sectional view illustrating an edge-side portion in FIG. 5.

Next, the LEDs 17 and the LED board 18 where the LEDs 17 are mounted will be described. Each LED 17 is a so-called top-surface-emitting type LED. As illustrated in FIGS. 4 and 5, the LEDs 17 are surface-mounted on the LED board 18 such that the light emission surfaces 17a faces a side opposite from the LED board 18 side. An optical axis of the LEDs 17 matches the Z-axis direction and matches a normal line to a display surface of the liquid crystal panel 11 (a plate surface of the optical member 15). The "optical axis" in this specification is referred to as an axis of light rays that matches a traveling direction of light rays having highest light emission strength (having a peak) among light rays emitted by the LEDs 17. Specifically, as illustrated in FIGS. 6 and 7, each LED 17 includes a blue LED component (a blue light emitting component, a blue LED chip), a sealing member, and a case. The blue LED component is a light emitting source and the sealing member seals the blue LED component within the case. Each LED 17 is a blue LED configured to emit single blue light. A part of the blue light rays emitted by the LED 17 is converted into green light rays or red light rays having different wavelengths through the wavelength conversion sheet 20, which will be described later in detail. The green light rays and red light rays having converted wavelengths and blue light rays emitted by the LED 17 are mixed with additive color mixture such that substantially white light exits the backlight device 12. The blue LED component included in the LED 17 is a semiconductor made of InGaN, for example. When a forward bias is applied, the blue LED component emits light in a wavelength range of blue light (about 420 nm to about 500 nm), that is, blue light. The light emitted by the LED 17 is light of single color that is same color as that of light emitted by the blue LED component. The blue LED components are connected to tracing patterns via a lead frame, and the tracing patterns are mounted on the LED board 18 that is arranged outside the case.

As illustrated in FIG. 3, the LED board 18 has a vertically elongated rectangular shape (a square shape, a rectangular shape) and is arranged in the chassis 14 along the bottom plate 14a such that a long-side direction thereof matches the Y-axis direction and a short-side direction hereof matches the X-axis direction. The LED board 18 includes a substrate that is made of metal such as aluminum material similar to that of the chassis 14 and tracing patterns (not illustrated) made of a metal film such as a copper foil are formed on a surface of the substrate via an insulation layer therebetween. A white reflection layer (not illustrated) is formed on an outermost surface of the LED board 18. The substrate of the LED board 18 may be made of insulation material such as ceramics. The above-structured LEDs 17 are surface-mounted on a plate surface of the substrate of the LED board 18 facing the front side (the plate surface facing the optical member 15), and the plate surface is the mounting surface 18a. The LEDs 17 are arranged in rows and columns (in a matrix) within a plane surface area of the mounting surface 18a of the LED board 18 and are electrically connected to each other through trace patterns formed within the plane surface area of the mounting surface 18a. Specifically, on the mounting surface 18a of the LED board 18, five (a relatively small number of) LEDs 17 are arranged in the short-side direction (the X-axis direction) and six (a relatively great number of) LEDs 17 are arranged in the long-side direction (the Y-axis direction). Thus, the LEDs 17 are arranged in rows and columns. Intervals between the LEDs 17 on the LED board 18 are substantially same and specifically, the LEDs 17 are arranged at equal intervals in the X-axis direction (a row direction) and in the Y-axis direction (a column direction).

As illustrated in FIG. 3, the LED boards 18 having the above structure are arranged in the X-axis direction and the Y-axis direction within the chassis 14 such that the short sides thereof are aligned with each other and the long sides thereof are aligned with each other. Specifically, four (a relatively great number of) LED boards 18 are arranged in the X-axis direction and two (a relatively small number of) LED boards 18 are arranged in the Y-axis direction within the chassis 14. The arrangement directions of the LED boards 18 match the X-axis direction and the Y-axis direction, respectively. The LED boards 18 are arranged at equal intervals in the X-axis direction and the Y-axis direction. The LEDs 17 are arranged at equal intervals in a matrix with respect to the X-axis direction (the row direction) and the Y-axis direction (the column direction) in a plane surface of the bottom plate 14a of the chassis 14. Specifically, twenty LEDs 17 are arranged in the long-side direction (the X-axis direction) and twelve LEDs 17 are arranged in the short-side direction (the Y-axis direction) in a matrix in a plane surface of the bottom plate 14a of the chassis 14. The optical member 15 is disposed to cover the light exit portion 14b of the chassis 14 and is opposite all the LED 17 groups with having a certain distance therebetween. Each of the LED boards 18 includes a connector portion to which traces (not illustrated) are connected and driving power is supplied from an LED driving board (a light source driving board), which is not illustrated, to each of the LED boards 18 through the traces.

The reflection sheet 19 is made of synthetic resin and has a white surface having good light reflectivity. The reflection sheet 19 does not absorb light having a specific wavelength at a surface thereof and irregularly reflects all the visible light. Therefore, the light reflectivity is substantially constant over an entire area of the reflection sheet 19. As illustrated in FIGS. 3 to 5, the reflection sheet 19 has a size that extends substantially an entire area of an inner surface of the chassis 14 and therefore, substantially an entire area of the LED boards 18 arranged in the chassis 14 can be covered with the reflection sheet 19 from the front side (the light exit side, the optical member 15 side). The reflection sheet 19 includes a bottom reflection portion 19a, four extended reflection portions 19b, and extended edge portions 19c. The bottom reflection portion 19a extends over the LED boards 18 (the bottom plate 14a) and collectively covers an entire area of the LED boards 18. Each of the four extended portions 19b extends from each outer edge of the bottom plate 19a toward the front side and is inclined with respect to the bottom reflection portion 19a. Each of the extended edge portions 19c extends outwardly from an outer end of each extended reflection portion 19b and is placed on the receiver plate 14d of the chassis 14. The reflection sheet 19 is placed on the front surfaces of the LED boards 18 such that the bottom reflection portion 19a overlaps the mounting surfaces 18a of the LED boards 18 on the front side. The bottom reflection portion 19a of the reflection sheet 19 has LED insertion holes (light source insertion holes) 19d at positions overlapping the LEDs 17 in a plan view such that each of the LEDs 17 is separately inserted through each LED insertion hole 19d. The LED insertion holes 19d are arranged in a matrix with respect to the X-axis direction and the Y-axis direction corresponding to the arrangement of the LEDs 17. Each of the extending portions 19b is inclined with respect to the bottom reflection portion 19a so as to extend from the bottom reflection portion 19a (an extending basal end side) toward the receiver plate 14d of the chassis 14 (an extending distal end side).

Figure 8:
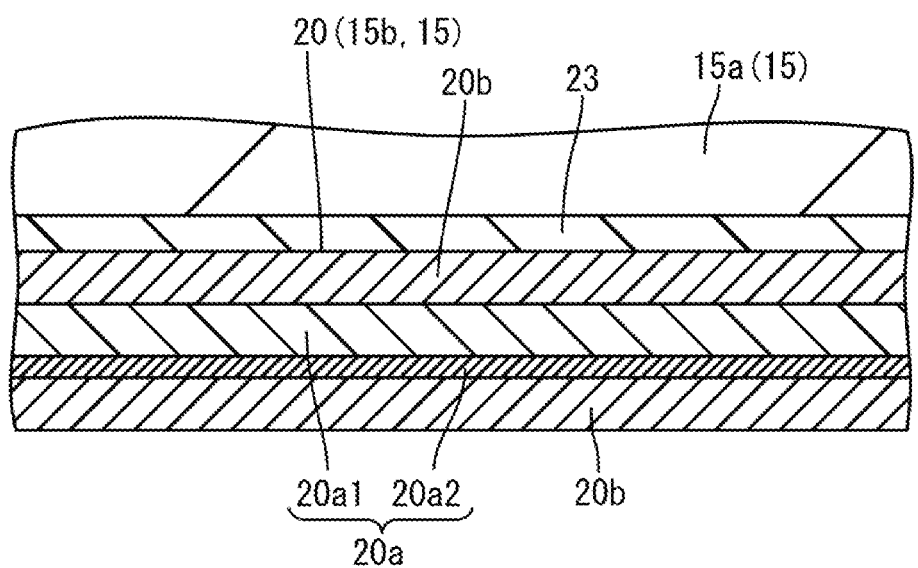
FIG. 8 is a magnified cross-sectional view of a wavelength conversion sheet.

Next, the wavelength conversion sheet 20 will be described in detail. As illustrated in FIG. 8, the wavelength conversion sheet 20 includes a phosphor layer (a wavelength converting layer, a phosphor film) 20a and a pair of protection layers (protection films) 20b sandwiching the phosphor layer 20a therebetween from the front and rear sides and protect it. The phosphor layer 20a contains phosphors (wavelength converting material) that convert wavelength of light rays emitted by the LEDs 17. The phosphor layer 20a dispersedly contains red phosphors and green phosphors. The red phosphors are excited by single blue light emitted by the LEDs 17 and emit red light (visible light having a specific wavelength range of red) and the green phosphors are excited by the single blue light emitted by the LEDs 17 and emit green light (visible light having a specific wavelength range of green). The phosphor layer 20a includes a substrate (a phosphor carrier) 20a1 that is a film made of substantially transparent synthetic resin and phosphor coating material 20a2 in which the red phosphors and the green phosphors are dispersed. The phosphor coating material 20a2 is applied on the substrate film with coating. The protection layer 20b is a film made of substantially transparent synthetic resin and has a good moisture-proof property.

In more detail, the phosphors of each color contained in the phosphor layer are excited by the blue light and have light emission spectrum as follows. The green phosphors are excited by blue light and emit light having a wavelength of green (in a wavelength range from about 500 nm to about 570 nm). The green phosphors emit green light as fluorescence light. The green phosphors preferably have light emission spectrum such that a peak wavelength is about 530 nm within a wavelength range of green and a half width of the peak is less than 40 nm. The red phosphors are excited by blue light and emit light having a wavelength of red (in a wavelength range from about 600 nm to about 780 nm). The red phosphors emit red light as fluorescence light. The red phosphors preferably have light emission spectrum such that a peak wavelength is about 610 nm within a wavelength of red and a half width of the peak is less than 40 nm.

The phosphors of each color are down conversion-type (down shifting-type) phosphors, excitation wavelengths of which are shorter than fluorescence wavelengths. The down conversion-type phosphors convert excitation light having shorter wavelengths and high energy levels into fluorescence light having longer wavelengths and lower energy levels. In comparison to a configuration in which up conversion-type phosphors, the excitation wavelengths of which are longer than the fluorescent wavelengths (e.g., about 28% of quantum efficiency), the quantum efficiency (light conversion efficiency) is higher, which is about 30% to 50%. The phosphors of each color are quantum dot phosphors. The quantum dot phosphors include semiconductor nanocrystals (e.g., diameters in a range from 2 nm to 10 nm) which tightly confine electrons, electron holes, or excitons with respect to all direction of a three dimensional space to have discrete energy levels. A peak wavelength of emitting light (a color of emitting light) is freely selectable by changing the dot size. A light emission spectrum of the emitting light emitted by the quantum dot phosphors (fluorescence light) has a sharp peak and a half width of each peak is small, that is, purity of the color is very high and their color gamut is large. Materials used for the quantum dot phosphors include a material prepared by combining elements that could be divalent cations such as Zn, Cd, and Pb and elements that could be divalent anions such as O, S, Se, and Te (e.g., cadmium selenide (CdCe), zinc sulfide (ZnS), a material prepared by combining elements that could be trivalent cations such as Ga and In and elements that could be trivalent anions such as P, As, and Sb (e.g., indium phosphide (InP), gallium arsenide (GaAs), and chalcopyrite-type compounds (CuInSe2). In this embodiment, CdSe and AnS are used for the material of the quantum dot phosphors. The quantum dot phosphors in this embodiment are core-shell quantum dot phosphors. Each core-shell quantum dot phosphor includes a quantum dot and a shell that is made of a semiconductor material having a relatively large bandgap and covering the quantum dot. An example of the core-shell quantum dot phosphor is Lumidot (trademark) CdSe/ZnS manufactured by Sigma-Aldrich Japan LLC.

As illustrated in FIG. 8, the wavelength conversion sheet 20 that converts the blue light emitted by the LEDs 17 with wavelength conversion includes the phosphor layer 20a that is sandwiched by the pair of protection layers 20b. According to such a configuration, the phosphor layer 20a is protected by the protection layers 20b. However, the outer peripheral edge of the phosphor layer 20a is likely to be exposed to the moisture contained in the external air. Therefore, the phosphors contained in the outer peripheral portion of the phosphor layer 20a are likely to be deteriorated due to moisture absorption than those in the middle portion thereof. Property deterioration of the phosphors is likely to be caused in a configuration in that the moisture protecting means such as sealing at the peripheral edge of the phosphor layer 20a is not provided. If the properties of the phosphors are deteriorated locally at the outer peripheral edge portion of the wavelength conversion sheet 20, the wavelength conversion efficiency of light is lowered at the outer peripheral portion than that in the middle portion. Therefore, the light transmitted through the outer peripheral edge portion may be likely to be tinged with a similar color to the light from the LEDs 17 (primary light) that is blue compared to the light transmitted through the middle portion. Namely, exit light rays exiting the backlight device 12 are close to white in the middle and tinged with blue in the outer peripheral portion. Thus, unevenness in color may be caused. The outer peripheral portion of the wavelength conversion sheet 20 in which unevenness in color may be caused has a plan-view frame shape having a certain width. A specific area (a width dimension) where the unevenness in color is caused may be altered according to conditions such as the moisture protecting means, a usage environment (temperature or humidity), and physical properties of each phosphor (anti-moisture absorption property). If the unevenness in color is caused in a display area where images appear, display errors may be caused.

As illustrated in FIGS. 6 and 7, in the backlight device 12 according to this embodiment, the diffuser plate 15a is included on the front side, that is, the light exit side with respect to the wavelength conversion sheet 20. According to such a configuration, the phosphors contained in the outer peripheral portion of the wavelength conversion sheet 20 are deteriorated due to moisture absorption and difference in tint may be caused between a tint of light rays transmitted through the outer peripheral portion of the wavelength conversion sheet 20 and a tint of light rays transmitted through the middle portion of the wavelength conversion sheet 20. Even if such difference in tint is caused, diffusing effects are exerted on both of the transmitted light rays by the diffuser plate 15a arranged on the front side and the light rays exit the backlight device 12 as illumination light. Therefore, difference in tint is less likely to be seen between the light rays exiting the middle portion and those exiting the outer peripheral portion among the exit light rays exiting the backlight device 12. Especially in this embodiment, the green phosphors and the red phosphors contained in the wavelength conversion sheet 20 are quantum dot phosphors, and the property deterioration is less likely to be caused in the quantum dot phosphors due to the moisture absorption and wavelength conversion efficiency is less likely to be lowered in the outer peripheral portion of the wavelength conversion sheet 20 compared to other type of phosphors. Further, the light rays transmitted through the wavelength conversion sheet 20 are dispersed by the diffuser plate 15a as described before, and the unevenness in color that may be caused is effectively reduced.

Specifically, as illustrated in FIGS. 6 and 7, the wavelength conversion sheet 20 is bonded on a rear side surface of the diffuser sheet 15a, that is, on a plate surface of the diffuser sheet 15a opposite from the light exit side. Accordingly, flatness of the wavelength conversion sheet 20 is ensured by the diffuser plate 15a, and the wavelength conversion sheet 20 is bonded on the diffuser plate 15a via an adhesive layer 23 therebetween. The adhesive layer 23 is a transparent optical adhesive film such as optical clear adhesive (OCA). Accordingly, the light rays reflect off an interface between the wavelength conversion sheet 20 and the adhesive layer 23 or an interface between the adhesive layer 23 and the diffuser plate 15a and are likely to pass through the wavelength conversion sheet 20 again. As a result, wavelength conversion efficiency of light by the phosphors contained in the wavelength conversion sheet 20 is increased. Further, the diffuser plate 15a has a plan-view size substantially same as that of the wavelength conversion sheet 20 and is disposed to cover a substantially entire area of the wavelength conversion sheet 20 from the front side. According to such a configuration, the diffusing effects are evenly exerted on the light rays transmitted through the middle portion and the outer peripheral portion of the wavelength conversion sheet 20 and unevenness in color is less likely to be caused.

As illustrated in FIGS. 6 and 7, the wavelength conversion sheet 20, the diffuser plate 15a, the prism sheet 21, and the reflective-type polarizing sheet 22, which are included in the optical member 15, are layered from the rear side in this order. The prism sheet 21 and the reflective-type polarizing sheet 22, which are optical sheets 15b thinner than the diffuser plate 15a, are sequentially layered on the diffuser plate 15a on the front side thereof. The diffuser plate 15a is thicker and higher in rigidity than the optical sheets 15b such as the prism sheet 21 and the reflective-type polarizing sheet 22. The flatness of the prism sheet 21 and the reflective-type polarizing sheet 22 can be sufficiently maintained by disposing the prism sheet 21 and the reflective-type polarizing sheet 22 directly on the diffuser plate 15a.

Operations of the device having the above configuration according to this embodiment will be described. When the liquid crystal display device 10 is turned on, various signals relating display output from a control board (not illustrated) are transmitted to the liquid crystal panel 11 to control the driving of the liquid crystal panel 11 and control the driving of the LEDs 17 on the LED board 18 by an LED driving circuit board (not illustrated). As illustrated in FIGS. 4 and 5, the light emitted by the LEDs 17 that are turned on may directly reach the optical member 15 and may reflect off the reflection sheet 19 and indirectly reach the optical member 15. Predefined optical effects are exerted on the light by the optical member 15 and the light is directed toward the liquid crystal panel 11. Accordingly, the light emitted by the lighted LEDs 17 is used for displaying images in a display area of the liquid crystal panel 11.

Next, optical effects of the backlight device 12 (except for optical effects of the diffuser plate 15a and the wavelength conversion sheet 20, which will be described later) will be described in detail. As illustrated in FIGS. 4 and 5, the optical effects are exerted on the blue light rays emitted by the LEDs 17 (the primary light rays) by the diffuser plate 15a and the optical sheets 15b of the optical member 15. Since the optical sheets 15b include the wavelength conversion sheet 20, some of the blue light rays emitted by the LEDs 17 are converted to the green light rays and the red light rays (secondary light rays) by the green phosphors and the red phosphors contained in the wavelength conversion sheet 20. The green light rays and the red light rays obtained through the wavelength conversion, that are yellow light rays (secondary light rays), and the blue light rays (the primary light rays) from the LEDs 17 form substantially white illumination light. The selective light collecting effects (the anisotropic light collecting effects) are exerted on the blue light rays from the LEDs 17 (primary light rays), and the green light rays and the red light rays (secondary light rays) obtained through the wavelength conversion with respect to the Y-axis direction by the prism sheet 21. Specific polarized light rays (p-wave) are selectively passed through the reflective-type polarizing sheet 22 and directed to the liquid crystal panel 11. Specific polarized light rays (s-wave) other than the specific polarized light rays described above are selectively reflected to the rear side. The s-wave reflected by the reflective-type polarizing sheet 22, the light rays reflected to the rear side without the light collecting effects by the prism sheet 21, or the light rays reflected to the rear side by the diffuser plate 15a are reflected again by the reflection sheet 19 to travel to the front side.

Next, optical effects of the diffuser plate 15a and the wavelength conversion sheet 20 will be described in detail. The wavelength conversion sheet 20 is disposed closest to the rear side or closest to the LEDs 17 among the optical member 15. Therefore, the blue light rays from the LEDs 17 (the primary light rays) are directly supplied to the wavelength conversion sheet 20 or reflected by the reflection sheet 19 and indirectly supplied to the wavelength conversion sheet 20. As illustrated in FIG. 8, the wavelength conversion sheet 20 includes the phosphor layer 20a sandwiched between the pair of protective layers 20b and the green phosphors and the red phosphors are contained in the phosphor layer 20a. The blue light rays from the LEDs 17 are converted into the green light rays and the red light rays (the secondary light rays) by the green phosphors and the red phosphors with the wavelength conversion. In the outer peripheral portion of the wavelength conversion sheet 20, the outer peripheral edge of the phosphor layer 20a is likely to be exposed to the moisture contained in the external air compared to the middle portion, and therefore, the property deterioration due to the moisture absorption is likely to be caused in the green phosphors and the red phosphors. Therefore, wavelength conversion efficiency of blue light by the green phosphors and the red phosphors is lowered in the outer peripheral portion of the wavelength conversion sheet 20 compared to that in the middle portion, and the ratio of blue light rays included in the transmitted light rays is higher in the outer peripheral portion of the wavelength conversion sheet 20 compared to that in the middle portion. Therefore, the transmitted light rays are likely to be tinged with blue. The diffuser plate 15a that is thicker than the wavelength conversion sheet 20 is overlapped with the wavelength conversion sheet 20 on the light exit side. Therefore, even if the above-described unevenness in color is caused in the transmitted light through the wavelength conversion sheet 20, the transmitted light is diffused by the diffuser plate 15a such that the light rays transmitted through the outer peripheral portion of the wavelength conversion sheet 20 and the light rays transmitted through the middle portion thereof are mixed with each other and the unevenness in color is less likely to be caused in the exit light exiting the diffuser plate 15a. Accordingly, display quality of images (television images) that appear on the display area of the liquid crystal panel 11 is less likely to be lowered.

As illustrated in FIGS. 6 and 7, the wavelength conversion sheet 20 is bonded on the rear plate surface of the diffuser plate 15a via the adhesive layer 23. Therefore, the wavelength conversion sheet 20 has high flatness by the diffuser plate 15a and the light rays transmitting through the wavelength conversion sheet 20 reflect off the interface between the wavelength conversion sheet 20 and the adhesive layer 23 and the interface between the adhesive layer 23 and the diffuser plate 15a and likely to transmit through the wavelength conversion sheet 20 again. Therefore, wavelength conversion efficiency of light by each phosphor contained in the wavelength conversion sheet 20 is further increased. Specifically, the wavelength conversion efficiency of light by each phosphor contained in the wavelength conversion sheet 20 is increased by about from 3% to 5%. The wavelength conversion sheet 20 can keep high flatness such that deformation such as wrinkles is less likely to be caused on the wavelength conversion sheet 20 and unevenness in luminance is less likely to be caused. Further, the diffuser plate 15a is disposed to cover an entire area of the wavelength conversion sheet 20 from the front side, and therefore, the diffusing effects are evenly exerted on the transmitted light rays through the middle portion and the outer peripheral portion of the wavelength conversion sheet 20 and the unevenness in color is less likely to be caused. The prism sheet 21 and the reflective-type polarizing sheet 22 are sequentially layered on the diffuser plate 15a on the front side thereof such that the flatness of the prism sheet 21 and the reflective-type polarizing sheet 22 is effectively maintained by the diffuser sheet 15a. Accordingly, the deformation such as wrinkles is less likely to be caused on the prism sheet 21 and the reflective-type polarizing sheet 22 and unevenness in luminance is less likely to be caused.

As described above, the backlight device (the lighting device) 12 according to this embodiment includes the LEDs (the light source) 17, the wavelength conversion sheet (the wavelength conversion member) 20 containing the phosphors that convert light from the LEDs 17 with wavelength conversion, and the diffuser plate 15a that exerts diffusing effects on the light from the LEDs 17 and is thicker than the wavelength conversion sheet 20 and disposed on the light exit side with respect to the wavelength conversion sheet 20.

Accordingly, the diffusing effects are exerted on the light rays emitted by the LEDs 17 by the diffuser plate 15a and wavelength conversion is performed on the light rays from the LEDs 17 by the phosphors contained in the wavelength conversion sheet 20. The diffuser plate 15a is thicker than the wavelength conversion sheet 20 and has high flatness, and accordingly, the light rays from the LEDs 17 are evenly dispersed within a plate surface area of the diffuser plate 15a. The diffuser plate 15a is disposed on the light exit side with respect to the wavelength conversion sheet 20. According to such a configuration, even if the phosphors are deteriorated due to moisture absorption at the outer peripheral portion of the wavelength conversion sheet 20 and the difference in tint is caused between the tint of light rays transmitted through the outer peripheral portion of the wavelength conversion sheet 20 and the tint of light rays transmitted through the middle portion thereof, the diffusing effects are exerted on the transmitted light rays by the diffuser plate 15a and the light rays exits the device. Therefore, the difference in tint is less likely to be caused in the exit light rays exiting the middle portion and those exiting the outer peripheral portion and unevenness in color is less likely to be caused.

The wavelength conversion sheet 20 is bonded on the plate surface of the diffuser plate 15a opposite from the light exit side. Accordingly, the flatness of the wavelength conversion sheet 20 is maintained by the diffuser plate 15a.

The adhesive layer 23 is between the wavelength conversion sheet 20 and the diffuser plate 15a. According to such a configuration, the transmitted light rays through the wavelength conversion sheet 20 are reflected by the interface between the wavelength conversion sheet 20 and the adhesive layer 23 and the interface between the adhesive layer 23 and the diffuser plate 15a and are likely to pass through the wavelength conversion sheet 20 again. Accordingly, the wavelength conversion efficiency of by the phosphors contained in the wavelength conversion sheet 20 is further increased.

The prism sheet 21 and the reflective-type polarizing plate 22 that are optical sheets 15b thinner than the diffuser plate 15a are overlapped with the diffuser plate 15a on the light exit side. Accordingly, the flatness of the prism sheet 21 and the reflective-type polarizing plate 22 that are optical sheets 15b can be maintained by the diffuser plate 15a.

The diffuser plate 15a is disposed to cover the entire area of the wavelength conversion sheet 20 from the light exit side. Accordingly, the diffusing effects are exerted on the transmitted light rays passing through the wavelength conversion sheet 20 by the diffuser plate 15a and unevenness in color is less likely to be caused.

The LEDs 17 emit blue light and the wavelength conversion sheet 20 contains the green phosphors converting the blue light into green light with wavelength conversion and the red phosphors converting the blue light into red light with wavelength conversion as the phosphors. According to such a configuration, the blue light rays emitted by the LEDs 17 are converted into the green light rays and the red light rays by the green phosphors and the red phosphors contained in the wavelength conversion sheet 20. Among the light rays transmitted through the wavelength conversion sheet 20, the light rays transmitted through the outer peripheral portion of the wavelength conversion sheet 20 are likely to be tinged with blue by the deterioration of the green phosphors and the red phosphors contained in the outer peripheral portion due to the moisture absorption compared to the light rays transmitted through the middle portion. Even in such a case, the diffusing effects are exerted on the transmitted light rays through the outer peripheral portion and the transmitted light rays through the middle portion by the diffuser plate 15a and the light rays exit the diffuser plate. Therefore, the exit light rays are less likely to be tinged with blue in the outer peripheral portion and unevenness in color is less likely to be caused.

The wavelength conversion sheet 20 contains quantum dot phosphors as the phosphors. Accordingly, the wavelength conversion efficiency of light by the wavelength conversion sheet 20 is further increased and purity of the color is higher. The quantum dot phosphors are likely to be deteriorated by the moisture absorption compared to other type of phosphors, and the wavelength conversion efficiency is likely to be lowered at the outer peripheral portion of the wavelength conversion sheet 20. However, the light rays transmitted through the wavelength conversion sheet 20 are diffused through the diffuser plate 15a and the unevenness in color is less likely to be caused.

The wavelength conversion sheet 20 is opposite the light emission surfaces 17a of the LEDs 17 and disposed away from the light emission surfaces 17a on the light exit side. According to such a configuration, the light rays emitted by the LEDs 17 through the light emission surfaces 17a are supplied toward the wavelength conversion sheet 20 that is opposite the light emission surfaces 17a. The light rays supplied to the wavelength conversion sheet 20 are subjected to the wavelength conversion by the phosphors and the diffusing effects are exerted on the converted light rays by the diffuser plate 15a and the light rays exit the diffuser plate. Compared to a configuration in that a light guide plate is between the LEDs 17 and the wavelength conversion sheet 20, the light use efficiency is improved and it is preferable for increasing luminance and reducing power consumption.

The liquid crystal display device 10 according to this embodiment includes the above backlight device 12, and the liquid crystal panel (the display panel) 11 that displays images with using light supplied by the backlight device 12. According to the liquid crystal display device 10 having the above structure, unevenness in color of the exit light from the backlight device 12 is less likely to be caused and display with good display quality can be achieved.

The television device 10TV according to this embodiment includes the above display device 10. According to the television device 10TV, display quality of the liquid crystal display device 10 is good and display with good display quality can be achieved.

Second Embodiment

A second embodiment of the present invention will be described with reference to FIGS. 9 to 11. In the second embodiment, a wavelength conversion sheet 120 has a configuration different from that of the first embodiment. Configurations, operations, and effects similar to those of the first embodiment will not be described.

Figure 9:
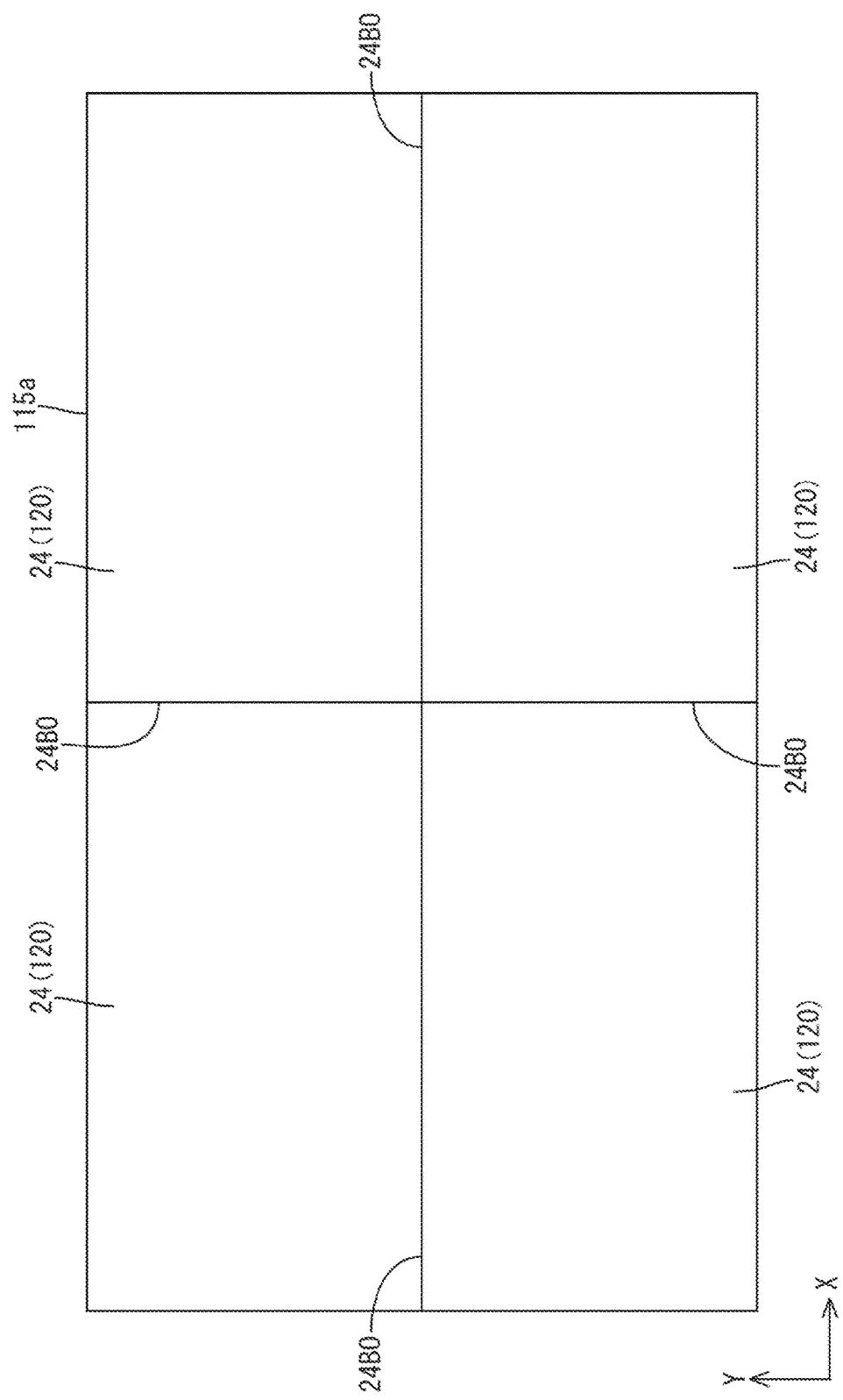
FIG. 9 is a bottom view illustrating a bottom surface of a diffuser plate where a wavelength conversion sheet is bonded according to a second embodiment of the present invention.
Figure 10:
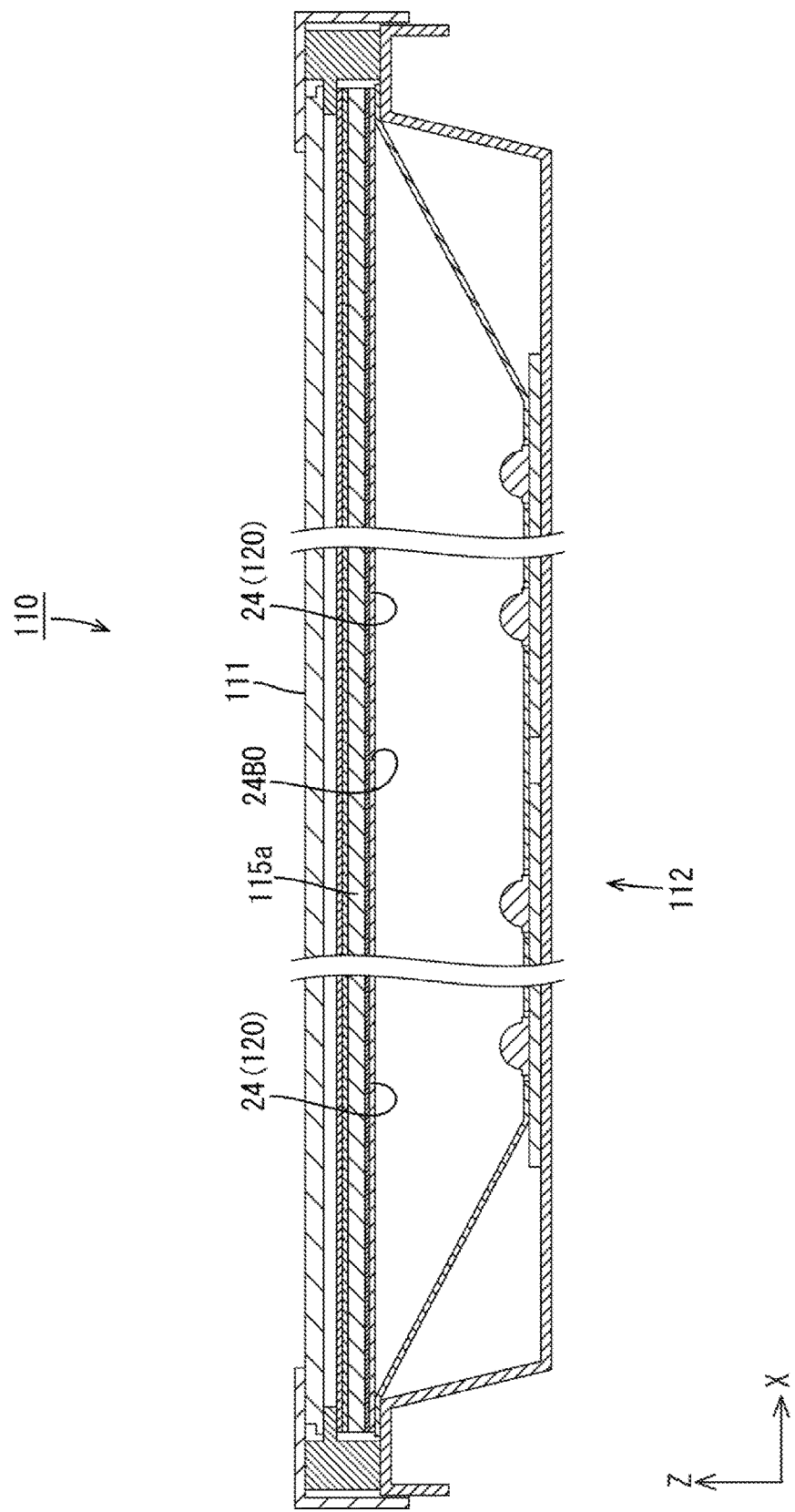
FIG. 10 is a cross-sectional view illustrating a cross-sectional configuration taken in a long-side direction of the liquid crystal display device.
Figure 11:
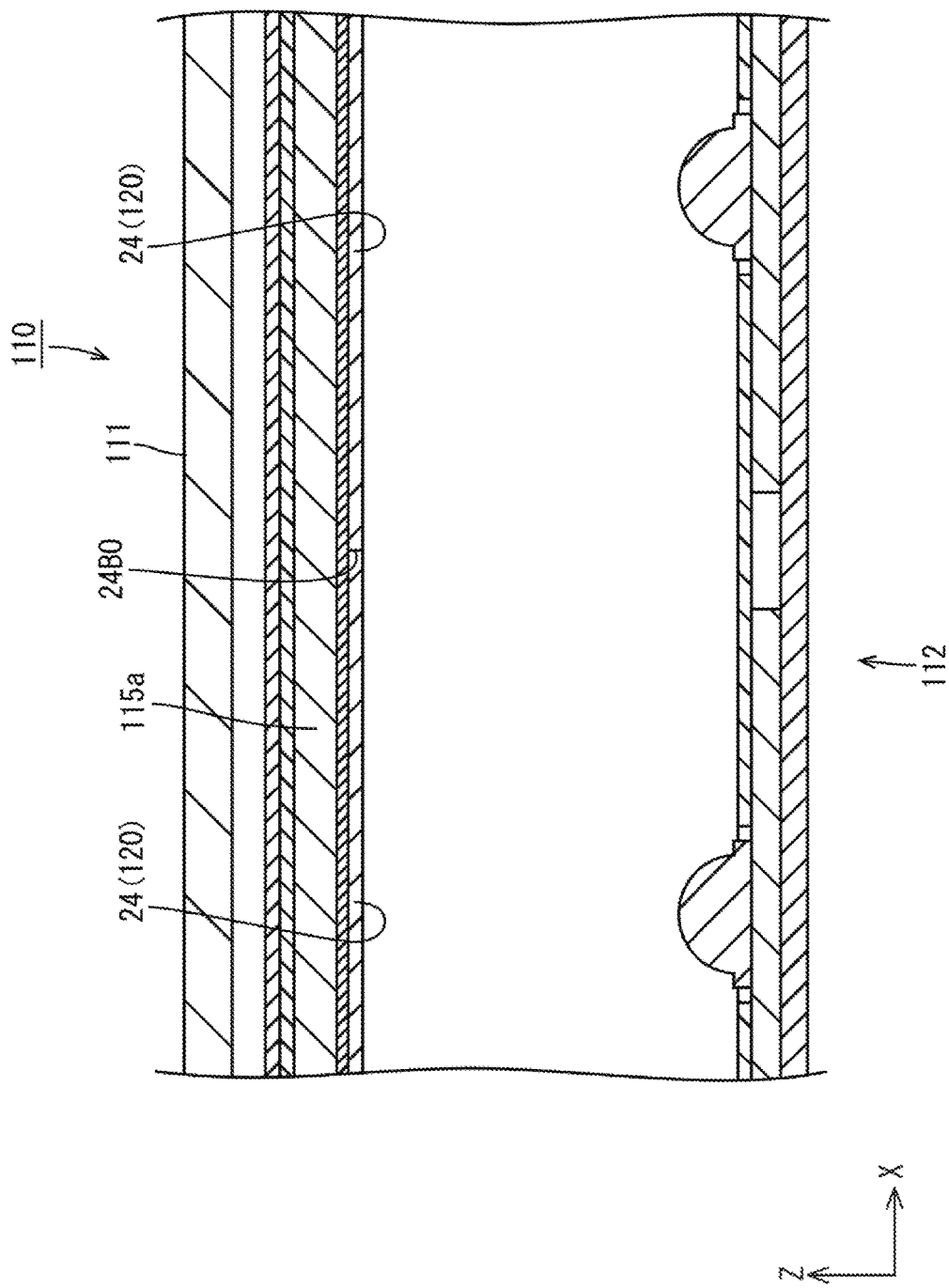
FIG. 11 is a magnified cross-sectional view illustrating a middle portion in FIG. 5.

As illustrated in FIGS. 9 to 11, the wavelength conversion sheet 120 of this embodiment includes separated wavelength conversion sheets (separated wavelength conversion members) 24 each of which has an outer shape smaller than that of a diffuser plate 115a. Specifically, the wavelength conversion sheet 120 includes four separated wavelength conversion sheets 24 and two separated wavelength conversion sheets 24 are arranged in a long-side direction (the X-axis direction) and a short-side direction (the Y-axis direction) within a plate surface area of the diffuser plate 115a. Each of the separated wavelength conversion sheets 24 has a long-side dimension and a short-side dimension that are substantially a half of the respective dimensions of the diffuser plate 115a. Namely, each of the separated wavelength conversion sheets 24 is similar to the diffuser plate 115a. Each of the separated wavelength conversion sheets 24 is bonded on the diffuser plate 115a such that the long-side direction and the short-side direction thereof matches the long-side direction and the short-side direction of the diffuser plate 115a, respectively. Therefore, when the separated wavelength conversion sheets 24 are bonded on the diffuser plate 115a, a border 24BO between adjacent separated wavelength conversion sheets 24 (a divided line, a separated position on the wavelength conversion sheet 120) is on a middle position of the diffuser plate 115 with respect to each of the long-side direction and the short-side direction and the border extends over an entire length of each of the long side and the short side of the diffuser plate 115a. Namely, the borders 24BO between the adjacent separated wavelength conversion sheets 24 cross each other and form a cross shape within a plate surface area of the diffuser plate 115a such that the plate surface area of the diffuser plate 115a is evenly divided into four.

According to such a configuration, as a screen size of the liquid crystal panel 111 is much increased (for example, 80 inches), the diffuser plate 115a that is suitable for the screen size of the liquid crystal panel 111 is prepared and the wavelength conversion sheet 120 suitable for the screen size of the liquid crystal panel 111 may not be able to be prepared. In such a case, the four separated wavelength conversion sheets 24 each of which is suitable for a half of the screen size of the liquid crystal panel 111 (for example, 40 inches) may be prepared for the large screen size. Thus, the above configuration is preferable for increasing a size of a backlight device 112 and a liquid crystal display device 110.

In the outer peripheral portion of each separated wavelength conversion sheet 24, the outer peripheral edge of the separated wavelength conversion sheet 24 is likely to be exposed to the moisture contained in the external air compared to the middle portion, and therefore, the property deterioration due to the moisture absorption is likely to be caused in the green phosphors and the red phosphors contained in the separated wavelength conversion sheet 24. Therefore, the wavelength conversion efficiency of the blue light rays by the green phosphors and the red phosphors is lower in the outer peripheral portion of each of the separated wavelength conversion sheets 24 than the middle portion thereof. Therefore, the ratio of the blue light rays to the transmitted light rays is higher in the outer peripheral portion than in the middle portion and the transmitted light rays are likely to be tinged with blue. If difference in tint is caused between transmitted light rays through the outer peripheral portion of each separated wavelength conversion sheet 24 and transmitted light rays through the middle portion thereof, a bluish area may be seen along the border 24BO of the adjacent separated wavelength conversion sheets 24 within the plate surface area of the diffuser plate 115a. Even in such a case, the diffuser plate 115a is disposed on the separated wavelength conversion sheets 24 on the light exit side, and therefore, the diffusing effects are exerted on the transmitted light rays through the outer peripheral portion and the middle portion of each separated wavelength conversion sheet 24 such that the light rays transmitted through the outer peripheral portion of each separated wavelength conversion sheet 24 and the light rays transmitted through the middle portion thereof are mixed with each other and the unevenness in color is less likely to be caused in the exit light exiting the diffuser plate 115a. Accordingly, display quality of images (television images) that appear on the display area of the liquid crystal panel 111 is less likely to be lowered.

As described before, according to this embodiment, the wavelength conversion sheet 120 includes the separated wavelength conversion sheets 24 each of which has an outer shape smaller than that of a diffuser plate 115a and that are arranged within a plate surface area of the diffuser plate 115a. Accordingly, the above configuration is preferable for increasing a size of the backlight device 112. In the configuration in that the separated wavelength conversion sheets 24 included in the wavelength conversion sheet 120 are arranged within the plate surface area of the diffuser plate 115a, the outer peripheral portion of each separated wavelength conversion sheet 24 is located in the middle portion within the plate surface of the diffuser plate 115a. However, the diffusing effects are exerted on the transmitted light rays through each of the separated wavelength conversion sheets 24 by the diffuser plate 115a that is disposed on the light exit side with respect to the separated wavelength conversion sheets 24. Accordingly, even if the difference in tint is caused between the tint of the light rays transmitted through the outer peripheral portion of each wavelength conversion sheet 24 and the tint of the light rays transmitted through the middle portion thereof, the diffusing effects are exerted on the transmitted light rays by the diffuser plate 115a and exits the diffuser plate 115a and the unevenness in color is less likely to be caused in the exit light rays.

Third Embodiment

A third embodiment of the present invention will be described with reference to FIG. 12. In the third embodiment, a second diffuser plate 25 is further included in the configuration of the above first embodiment. Configurations, operations, and effects similar to those of the first embodiment will not be described.

Figure 12:
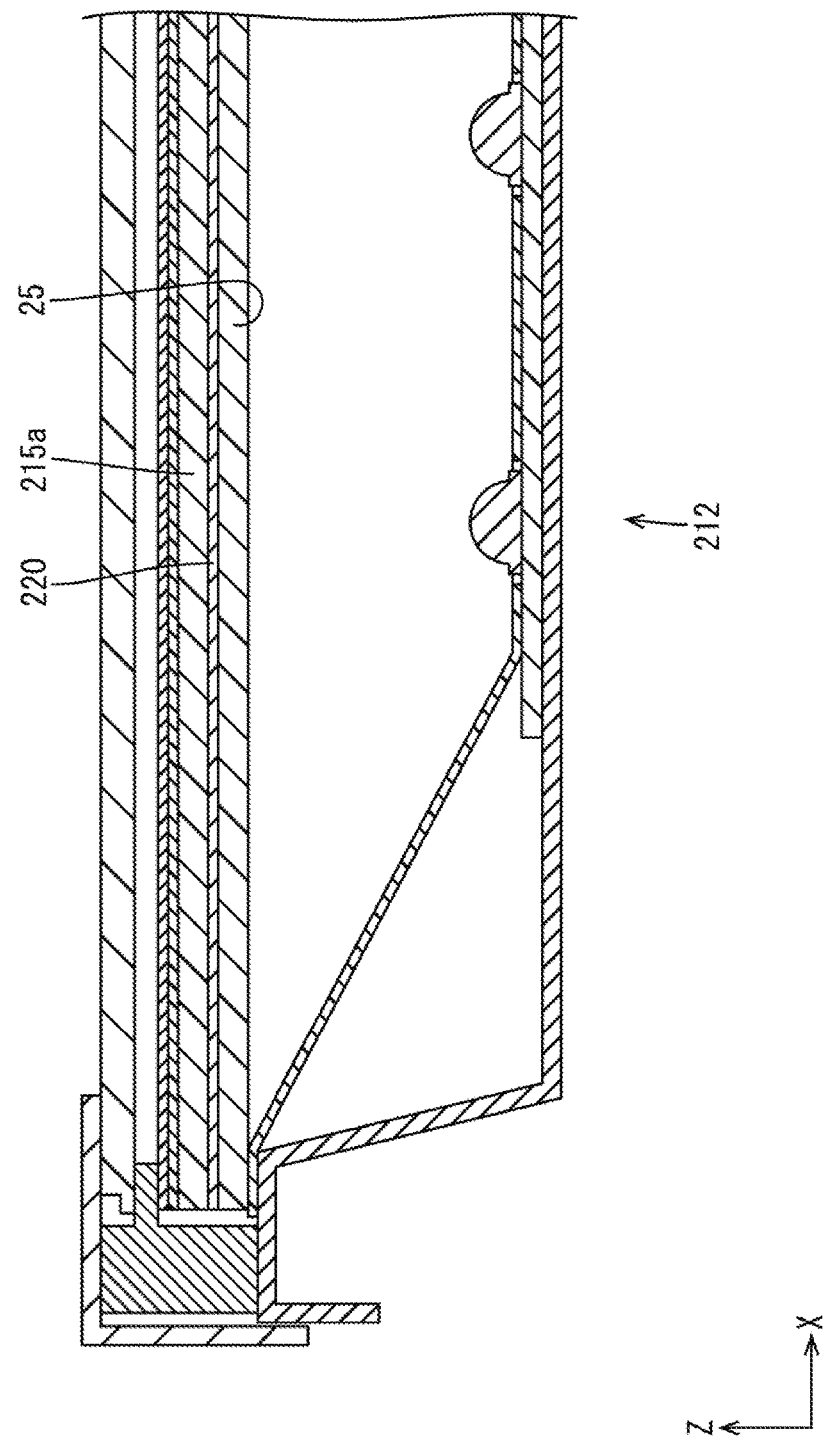
FIG. 12 is a cross-sectional view illustrating a cross-sectional configuration taken in a long-side direction of the liquid crystal display device according to a third embodiment of the present invention and is a magnified cross-sectional view of an edge-side portion thereof.

As illustrated in FIG. 12, a backlight device 212 according to this embodiment includes the second diffuser plate 25 that is disposed on a rear side of a wavelength conversion sheet 220 and overlapped with the wavelength conversion sheet 220 on an opposite side from the diffuser plate (a first diffuser plate) 215a. The second diffuser plate 25 is thicker than the wavelength conversion sheet 220 and has a substantially same thickness as the diffuser plate 215a. Specifically, a manufacturing cost of the backlight device 212 is preferably reduced by using same components for the second diffuser plate 25 and the diffuser plate 215a.

According to such a configuration, the wavelength conversion sheet 220 is supported by the second diffuser plate 25 from the rear side and flatness of the wavelength conversion sheet 220 can be maintained effectively without using the adhesive layer as is described in the first embodiment (refer FIGS. 6 and 7). Further, the wavelength conversion sheet 220 is held between the diffuser plate 215a and the second diffuser plate 25 such that the flatness thereof is further effectively maintained. The light rays on which the diffusing effects are exerted by the second diffuser plate 25 are subjected to the wavelength conversion through the wavelength conversion sheet 220, and therefore, the unevenness in luminance is further reduced.

As described before, according to this embodiment, the second diffuser plate 25 that is thicker than the wavelength conversion sheet 220 is disposed on a rear side of the wavelength conversion sheet 220 and overlapped with the wavelength conversion sheet 220 on an opposite side from the diffuser plate 215a. Accordingly, the wavelength conversion sheet 220 is supported by the second diffuser plate 25 from the opposite side from the diffuser plate 215a and held between the diffuser plate 215a and the second diffuser plate 25 such that flatness thereof is effectively maintained. The light rays on which the diffusing effects are exerted by the second diffuser plate 25 are subjected to the wavelength conversion through the wavelength conversion sheet 220, and therefore, the unevenness in luminance is further reduced.

Fourth Embodiment

A fourth embodiment of the present invention will be described with reference to FIGS. 13 and 14. In the fourth embodiment, a backlight device 312 of an edge light type is used in the configuration of the first embodiment. Configurations, operations, and effects similar to those of the first embodiment will not be described.

Figure 13:
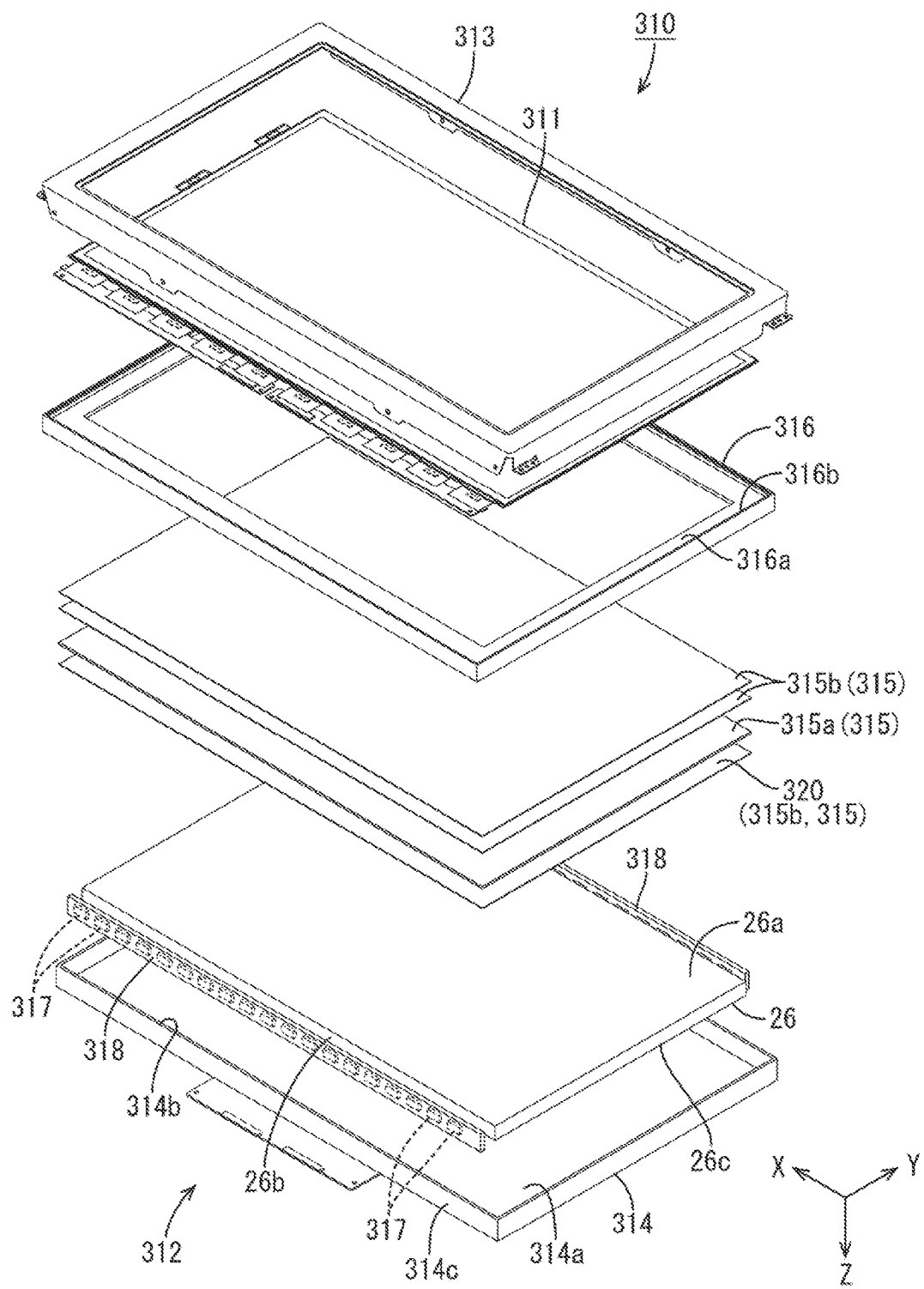
FIG. 13 is an exploded perspective view illustrating a general configuration of a liquid crystal display device according to a fourth embodiment of the present invention.

As illustrated in FIG. 13, a liquid crystal display device 310 according to this embodiment includes a liquid crystal panel 311 and the backlight device 312 of an edge light type that are integrally provided by a bezel 313. The configuration of the liquid crystal panel 311 is same as that of the first embodiment and will not be described. Hereinafter, a configuration of the backlight device 312 of the edge light type will be described.

As illustrated in FIG. 13, the backlight device 312 includes a chassis 314 of a substantially box shape having alight exit portion 314b that is open toward the front side (toward a liquid crystal panel 311) and an optical member 315 that is disposed to cover the light exit portion 314b of the chassis 314. The backlight device 312 further includes LEDs 317 that are a light source, a LED board 318 on which the LEDs 317 are mounted, a light guide plate 26 that guides light from the LEDs 317 toward the optical member 315 (the liquid crystal panel 311), and a frame 316 that presses the light guide plate 26 from the front side. The backlight device 312 includes the LED boards 318 having the LEDs 317 thereon on long-side edges thereof and includes the light guide plate 26 in a middle portion between the LED boards 318, and is a so-called an edge-light type (a side light type) backlight device. The edge-light type backlight device 312 according to this embodiment does not include the reflection sheet 19 included in the direct-type backlight device 12 according to the first embodiment. Next, the components of the backlight device 312 will be described in detail.

Figure 14:
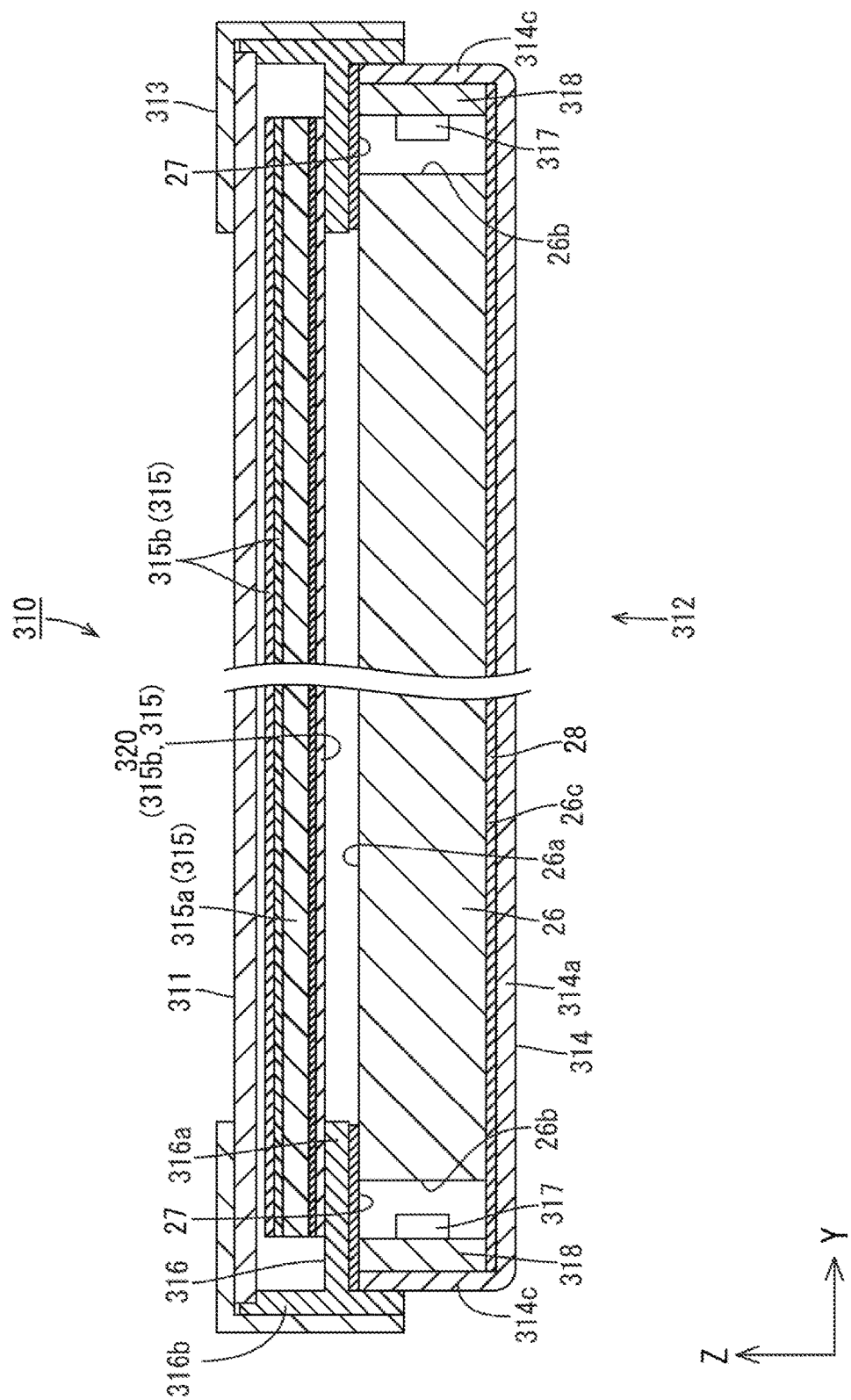
FIG. 14 is a cross-sectional view illustrating a cross-sectional configuration taken in a short-side direction of the liquid crystal display device.

The chassis 314 is made of metal and as illustrated in FIGS. 13 and 14, the chassis 314 includes a bottom plate 314a having a horizontally elongated rectangular shape similar to the liquid crystal panel 311, and side plates 314c each extending from an outer edge of each of the sides of the bottom plate 314a. The chassis 314 as a whole has a substantially shallow box shape that is open toward the front side. In the chassis 314 (the bottom plate 314a), the long-side direction matches the X-axis direction (the horizontal direction) and the short-side direction matches the Y-axis direction (the vertical direction). The frame 316 and the bezel 313 can be fixed on the side plates 314c.

As illustrated in FIG. 13, the frame 316 includes a frame portion 316a that extends along an outer peripheral edge of the light guide plate 26. The frame portion 316a presses entire periphery of the outer peripheral edge portion of the light guide plate 26 from the front side. As illustrated in FIG. 14, a first reflection sheet 27 reflecting light is disposed on a rear surface of each of the long-side portions of the frame portion 316a of the frame 316, that is, an opposing surfaces opposite the light guide plate 26 and the LED boards 318 (the LEDs 317). The first reflection sheet 27 extends to cover a substantially entire length of the long-side portion of the frame portion 316a. The first reflection sheet 27 is directly in contact with each edge portion of the light guide plate 26 close to the LEDs 317, and the edge portion of the light guide plate 26 and the LED board 318 are collectively covered with the first reflection sheet 27 from the front side. The frame portion 316a of the frame 316 that presses the light guide plate 26 from the front side supports the outer peripheral portion of the optical member 315 from the rear side. Accordingly, the optical member 315 is supported by the frame 316 with having a certain distance (an air layer) between the optical member 315 and light exit surface 26a of the light guide plate 26. The frame 16 further includes a liquid crystal panel support portion 316b projecting from the frame portion 316a toward the front side and supporting the outer peripheral edge portion of the liquid crystal panel 311 from the rear side.

The LEDs 317 have a configuration similar to that of the above first embodiment and a same configuration will not be described. As illustrated in FIG. 13, each of the LED boards 318 has an elongated plate shape extending in the long-side direction of the chassis 314 (in the X-axis direction, in a longitudinal direction of a light entrance surface 26b of the light guide plate 26) and is arranged within the chassis 314 such that a main plate surface is parallel to a X-Z plane and is vertical to the plate surface of the liquid crystal panel 311 and the light guide plate 26 (the optical member 315). A pair of the LED boards 318 are arranged to sandwich the light guide plate 26 with respect to the short-side direction (the Y-axis direction). The LEDs 317 are mounted on a main plate surface of each LED board 318, that is, a surface of each LED board 318 facing an inner side or the light guide plate 26 (a surface opposite the light guide plate 26). The LEDs 317 are arranged in a line (linearly) along the long-side direction (the X-axis direction) on the mounting surface of the LED board 318. Therefore, the LEDs 317 are arranged in the long-side direction on the long-side edge portions of the backlight device 312. The LEDs 317 mounted on each LED board 318 are connected in series through a board tracing portion (not illustrated). The LED boards 318 are arranged in the chassis 314 such that the mounting surfaces on which the LEDs 317 are mounted are opposite each other. Therefore, the light emission surfaces of the LEDs 317 mounted on the respective LED boards 318a are opposite each other and an optical axis of light rays from the LEDs 317 substantially matches the Y-axis direction.

The light guide plate 26 is made of transparent synthetic resin (having high light transmissivity) having a refraction index sufficiently higher than that of air (e.g., acrylic resin such as PMMA). As illustrated in FIG. 13, the light guide plate 26 has a horizontally-elongated rectangular shape similar to the liquid crystal panel 311 and the chassis 314 in the plan view. In the light guide plate 26, the long-side direction matches the X-axis direction and the short-side direction matches the Y-axis direction. The light guide plate 26 is arranged directly below the liquid crystal panel 311 and the optical member 315 within the chassis 314 and is held between the pair of LED boards 318 arranged at the long-side edge portions of the chassis 314 with respect to the Y-axis direction. Therefore, the LEDs 317 (the LED boards 318) and the light guide plate 26 are arranged in the Y-axis direction and the optical member 315 (the liquid crystal panel 311) and the light guide plate 26 are arranged in the Z-axis direction. The arrangement directions are perpendicular to each other. The light rays emitted by the LEDs 317 in the Y-axis direction enter the light guide plate 26 and the light rays travel within the light guide plate 26 toward the optical member 315 (in the Z-axis direction) and exits the light guide plate 26.

As illustrated in FIG. 28, the light guide plate 26 has a plate surface facing the front side that is a light exit surface 26a through which light rays within the light guide plate 26 exit toward the optical member 315 and the liquid crystal panel 311. The light guide plate 26 has outer peripheral edge surfaces that are adjacent to a plate surface thereof. The outer peripheral edge surfaces include long-side edge surfaces extending in the X-axis direction are opposite the LEDs 317 (the LED boards 318) with a certain distance therebetween and the long-side edge surfaces are light entrance surfaces 26b through which the light rays emitted by the LEDs 317 enter. The light entrance surfaces 26b are parallel to an X-Z plane and vertical to the light exit surface 26a. A second reflection sheet 28 is disposed on an opposite plate surface 26c that is opposite from the light exit surface 26a of the light guide plate 26 to cover an entire area of the opposite plate surface 26c. The second reflection sheet 28 is configured to reflect the light rays within the light guide plate 26 toward the front side. The second reflection sheet 28 extends to overlap the LED boards 318 (the LEDs 317) in the plan view and the LED boards 318 (the LEDs 317) are sandwiched between the second reflection sheet 28 and the first reflection sheet 27 on the front side. Accordingly, the light rays from the LEDs 317 are reflected repeatedly between the reflection sheets 27, 28 such that the light rays from the LEDs 317 efficiently enter through the light entrance surfaces 26b. On at least one of the light exit surface 26a and the opposite plate surface 26c of the light guide plate 26, a reflecting portion (not illustrated) that reflects the light rays within the light guide plate 26 or a scattering portion (not illustrated) that scatters the light rays within the light guide plate 26 may be formed with patterning to have a certain distribution within a plane surface. Accordingly, the exit light rays exiting through the light exit surface 26a are controlled to have an even distribution within a plane surface area.

As illustrated in FIG. 14, the optical member 315 includes a diffuser plate 315a and optical sheets 315b that are layered in the sequence same as that in the first embodiment and an outer peripheral edge portion of the optical member 315 is supported by the frame portion 316a of the frame 316 from the rear side. The optical sheets 315b include a wavelength conversion sheet 320 that is disposed opposite the light exit surface 26a of the light guide plate 26. The wavelength conversion sheet 320 converts the blue light rays from the LEDs 317 and exiting through the light exit surface 26a (primary light rays) into green light rays and red light rays (secondary light rays) by the green phosphors and the red phosphors with the wavelength conversion. Even if difference in tint is caused between the light rays transmitted through the outer peripheral portion of the wavelength conversion sheet 320 and the light rays transmitted through the middle portion thereof, the diffusing effects are exerted on the transmitted light rays by the diffuser plate 315a that is disposed on the front side with respect to the wavelength conversion sheet 320. Therefore, the unevenness in color is preferably reduced.

As described before, according to this embodiment, the light guide plate 26 configured to guide the light rays emitted by the LEDs 17 is included and the wavelength conversion sheet 320 is disposed opposite the light exit surface 26a of the light guide plate 26. According to such a configuration, the light rays emitted by the LEDs 317 enter and travel within the light guide plate 26 and exit the light guide plate 26 through the light exit surface 26a. The light rays exiting through the light exit surface 26a are subjected to the wavelength conversion by the phosphors contained in the wavelength conversion sheet 320. Thereafter, the diffusing effects are exerted on the light rays by the diffuser plate 315a and the light rays exit the diffuser plate 315a. Unevenness in luminance is less likely to be caused in the light rays that are supplied to the wavelength conversion sheet 320 after travelling within the light guide plate 26. Therefore, a distance between the light guide plate 26 and the wavelength conversion sheet 320 is reduced and it is preferable for reducing a thickness of the device.

Fifth Embodiment

A fifth embodiment of the present invention will be described with reference to FIG. 15. In the fifth embodiment, a wavelength conversion sheet 420 has a configuration different from that of the first embodiment. Configurations, operations, and effects similar to those of the first embodiment will not be described.

Figure 15:
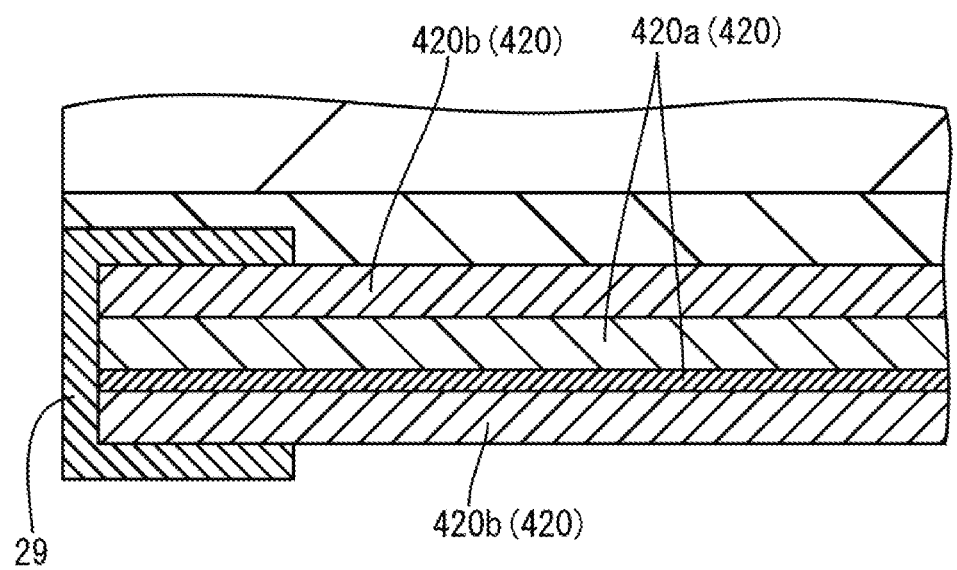
FIG. 15 is a cross-sectional view illustrating an edge-side portion of a wavelength conversion sheet and a diffuser plate according to a fifth embodiment of the present invention.

As illustrated in FIG. 15, the wavelength conversion sheet 420 according to this embodiment includes a sealing member 29 configured to seal the outer peripheral edge portion thereof. The sealing member 29 is disposed to hold collectively outer peripheral edge portions of a phosphor layer 420a and a pair of protection layers 420b over an entire periphery thereof. According to such a configuration, the outer peripheral edge of the phosphor layer 420a is not exposed to the outside and is not exposed to external air. Therefore, properties of the phosphor layer 420a are less likely to be deteriorated by moisture contained in the external air.

Other Embodiments

The present invention is not limited to the embodiments, which have been described using the foregoing descriptions and the drawings. For example, embodiments described below are also included in the technical scope of the present invention.

(1) In each of the above embodiments, three optical sheets are included. However, the number of the optical sheets may be two or less or four or more. Kinds of the optical sheets other than the wavelength conversion sheet may be altered and for example, a diffuser sheet or a micro lens sheet may be used. The specific order in which the optical sheets other than the wavelength conversion sheet are layered may be altered.

(2) In each of the above embodiments, the two optical sheets (the prism sheet and the reflective-type polarizing sheet) are layered on the diffuser plate on the front side thereof. However, one optical sheet or three or more optical sheets may be layered on the diffuser plate on the front side thereof.

(3) In each of the above embodiments, the adhesive layer is between the diffuser plate and the wavelength conversion sheet or the diffuser plate and the wavelength conversion sheet are directly overlapped with each other. However, another one or multiple optical sheet(s) (such as a prism sheet, a reflective-type polarizing sheet) may be disposed between the diffuser plate and the wavelength conversion sheet. Another one or multiple optical sheet(s) (such as a prism sheet, a reflective-type polarizing sheet) may be disposed on the rea side of the wavelength conversion sheet.

(4) In each of the above embodiments (except for the forth embodiment), the transparent optical adhesive film such as optical clear adhesive (OCA) is used as the adhesive layer between the diffuser plate and the wavelength conversion sheet. However, substantially transparent adhesive agents, substantially transparent photo-curable resin (including ultraviolet curable resin), or a substantially transparent double-sided adhesive tape may be used as the adhesive layer.

(5) In each of the above embodiments (except for the fourth embodiment), the adhesive layer is between the diffuser plate and the wavelength conversion sheet. However, for example, the wavelength conversion sheet may be bonded on the diffuser plate with heat welding or ultrasonic wave welding such that the wavelength conversion sheet may be bonded on the diffuser plate without using the adhesive layer. The wavelength conversion sheet may not be bonded on the diffuser plate.

(6) In each of the above embodiments, the diffuser plate and the wavelength conversion sheet have a substantially same plan view size. However, each of the diffuser plate and the wavelength conversion sheet has a different plan view size and any one of the diffuser plate and the wavelength conversion sheet may be larger than the other one. It is more preferable that the diffuser plate has a plan view size larger than that of the wavelength conversion sheet.

(7) In the second embodiment, the number of the separated wavelength conversion sheets is four. However, the number of the separated wavelength conversion sheets may be two, three, or five or more. The specific arrangement of the separated wavelength conversion sheets within the plate surface area of the diffuser plate may be altered, if necessary.

Further, a specific plan view shape of the separated wavelength conversion sheets may be altered, if necessary.

(8) In a modified embodiment of the third embodiment, a transparent plate member that is substantially transparent and exerts few diffusing effects on light rays may be used instead of the second diffuser plate. Any component may be used for the second diffuser plate as long as it can support the wavelength conversion sheet from the rear side to keep the flatness thereof and the component may not necessarily exert diffusing effects. An optical plate member that exerts optical effects other than the diffusing effects may be used for the second diffuser plate.

(9) In the third embodiment, the diffuser plate, the second diffuser plate, and the wavelength conversion sheet are overlapped with each other directly without having the adhesive layer therebetween. However, an adhesive layer may be disposed between the wavelength conversion sheet and each of the diffuser plate and the second diffuser plate. An adhesive layer may be disposed between the diffuser plate and the wavelength conversion sheet or between the second diffuser plate and the wavelength conversion sheet.

(10) In a modified embodiment of the fourth embodiment, the wavelength conversion sheet may be disposed directly on the light exit surface of the light guide plate. In such a configuration, a certain clearance may be provided between the wavelength conversion sheet and the diffuser plate or the diffuser plate may be disposed on the wavelength conversion sheet directly or via an adhesive layer.

(11) The configuration of the second embodiment may be combined with the configuration of each of the third to fifth embodiments.

(12) The configuration of the third embodiment may be combined with the configuration of each of the fourth and fifth embodiments.

(13) The configuration of the fourth embodiment may be combined with the configuration of fifth embodiment.

(14) In each of the above embodiments (except for the fourth embodiment), the reflection sheet includes extended reflection portions extending with being inclined with respect to the bottom reflection portion. However, a specific configuration of the extended reflection portions may be altered, if necessary (such as an inclination angle of each of a short-side extended reflection portion and a long-side extended reflection portion, a plan view width dimension of each of the short-side extended reflection portion and the long-side extended reflection portion).

(15) In each of the above embodiments, the LEDs emitting light of a single blue color are used as the light source. LEDs emitting light of other color than blue may be used and the color exhibited by the phosphors contained in the wavelength conversion sheet may be altered according to the color of light from the LEDs. For example, LEDs emitting magenta light may be used and in such a configuration, the wavelength conversion sheet may contain the green phosphors that exhibit green light that makes a complementary color pair with magenta light such that illumination light (exit light) from the backlight device can be whitened.

(16) Other than the above embodiment (15), LEDs emitting purple light may be used and in such a configuration, the green phosphors and the yellow phosphors may be used for the phosphors contained in the wavelength conversion sheet to exhibit yellowish green light that makes a complementary color pair with purple light such that illumination light (exit light) from the backlight device can be whitened.

(17) Other than the above embodiments (15), (16), LEDs emitting cyan light may be used. In such a configuration, the red phosphors that exhibit red light that makes a complementary color pair with cyan light may be used as the phosphor to be contained in the wavelength conversion sheet such that illumination light (exit light) from the backlight device can be whitened.

(18) In each of the above embodiments, the wavelength conversion sheet contains the green phosphors and the red phosphors. However, the wavelength conversion sheet may contain only the yellow phosphors or may contain the red phosphors or the green phosphors in addition to the yellow phosphors.

(19) In each of the above embodiments, the quantum dot phosphors used for the phosphors contained in the wavelength conversion sheet are the core-shell type quantum dot phosphors including CdSe and ZnS. However, core type quantum dot phosphors each having a single internal composition may be used. For example, a material (CdSe, CdS, ZnS) prepared by combining Zn, Cd, Hg, or Pb that could be a divalent cation with O, S, Se, or Te that could be a dianion may be singly used. A material (indium phosphide (InP), gallium arsenide (GaAs)) prepared by combining Ga or In that could be a tervalent cation with P, As, or Sb that could be a tervalent anion or chalcopyrite type compounds (CuInSe2) may be singly used. Other than the core-shell type quantum dot phosphors and the core type quantum dot phosphors, alloy type quantum dot phosphors may be used. Furthermore, quantum dot phosphors that do not contain cadmium may be used.

(20) In each of the above embodiments, the quantum dot phosphors used for the phosphors contained in the wavelength conversion sheet are the core-shell type quantum dot phosphors including CdSe and ZnS. However, core-shell type quantum dot phosphors including a combination of other materials may be used.

(21) In each of the above embodiments, the quantum dot phosphors are contained in the wavelength conversion sheet. Other types of phosphors may be contained in the wavelength conversion sheet. For example, sulfide phosphors may be used for the phosphors contained in the wavelength conversion sheet. Specifically, $SrGa_2S_4:Eu^{2+}$ may be used for the green phosphors and $(Ca, Sr, Ba)S:Eu^{2+}$ may be used for the red phosphors.

(22) Other than the above (21), $(Ca, Sr, Ba)_3SiO_4:Eu^{2+}$, $\beta$-$SiAlON:Eu^{2+}$, or $Ca_3Sc_2Si_3O_{12}:Ce^{3+}$ may be used for the green phosphors contained in the wavelength conversion sheet. $(Ca, Sr, Ba)_2SiO_5N_8:Eu^{2+}$, or $CaAlSiN_3:Eu^{2+}$ may be used for the red phosphors contained in the wavelength converting sheet. $(Y, Gd)_3(Al, Ga)_5O_{12}:Ce^{3+}$ (so-called YAG:$Ce^{3+}$), $\alpha$-$SiAlON:Eu^{2+}$, or $(Ca, Sr, Br)_3SiO_4:Eu^{2+}$ may be used for the yellow phosphors contained in the wavelength conversion sheet. Further, a complex fluoride fluorescent material (e.g., manganese-activated potassium fluorosilicate ($K_2TiF_6$)) may be used for the phosphors contained in the wavelength conversion sheet.

(23) Other than the above (21) and (22), organic phosphors may be used for the phosphors contained in the wavelength conversion sheet. The organic phosphors may be low molecular organic phosphors including triazole or oxadiazole as a basic skeleton.

(24) Other than the above (21), (22), and (23), phosphors configured to perform wavelength conversion through energy transfer via dressed photons (near-field light) may be used for the phosphors contained in the wavelength conversion sheet. Preferable phosphors of this kind may be phosphors including zinc oxide quantum dots (ZnO-QD) with diameters from 3 nm to 5 nm (preferably about 4 nm) and DCM pigments dispersed in the zinc oxide quantum dots.

(25) Other than each of the above embodiments, the emission spectrum of the LEDs (peak wavelengths, half width of each peak) and the emission spectrum of the phosphors contained in the phosphor layer (peak wavelengths, half width of each peak) may be altered as appropriate.

(26) In each of the above embodiments, InGaN is used for the material of the LED components in the LEDs. However, GaN, AlGaN, GaF, ZnSe, ZnO, or AlGaInP may be used for the material of the LED components.

(27) In each of the above embodiments, the chassis is made of metal. However, the chassis may be made of synthetic resin.

(28) In each of the above embodiments (except for the fourth embodiment), the optical member is pressed from the front side by the frame and held between the frame and the receiver plate of the chassis. For example, the optical member may be supported by the frame from the rear side so as not to press the optical member from the front side.

(29) In each of the above embodiments, the LEDs are used as the light source. However, other light sources such as an organic EL may be used.

(30) In each of the above embodiments, the liquid crystal panel and the chassis are arranged in a vertical position such that the short-side direction thereof matches the vertical direction. However, the liquid crystal panel and the chassis may be arranged in a vertical position such that the long-side direction thereof matches the vertical direction.

(31) In each of the above embodiments, the TFTs are used as switching components of the liquid crystal display device. However, switching components other than the TFTs (such as thin film diodes (TFDs)) may be included in the scope of the present invention. Furthermore, a liquid crystal display device configured to display black and white images other than the liquid crystal display device configured to display color images.

(32) In each of the above embodiments, the transmissive-type liquid crystal display device is described. However, a reflection-type liquid crystal display device and a semi-transmissive type liquid crystal display device may be included in the scope of the present invention.

(33) In each of the above embodiments, the liquid crystal display device including the liquid crystal panel as the display panel is used. The present invention may be applied to display devices including other type of display panel.

(34) In each of the above embodiments, the television device including the tuner is included. However, a display device without including a tuner may be included in the scope of the present invention. Specifically, the present invention may be applied to liquid crystal display devices used as digital signage or an electronic blackboard.

EXPLANATION OF SYMBOLS

10, 110, 310: liquid crystal display device (display device), 11, 111, 311: liquid crystal panel (display panel), 12, 112, 212, 312: backlight device (lighting device), 15a, 115a, 215a, 315a: diffuser plate, 15b, 315b: optical sheet, 17, 317: LED (light source), 17a: light emission surface, 20, 120, 220, 320, 420: wavelength conversion sheet (wavelength conversion member), 21: prism sheet (optical sheet), 22: reflective-type polarizing sheet (optical sheet), 23: adhesive layer, 24: separated wavelength conversion sheet (separated wavelength conversion member), 25: second diffuser plate, 26: light guide plate, 26a: light exit surface

The invention claimed is:

1. A lighting device comprising:
a light source;
a plurality of wavelength conversion sheets containing phosphors that convert light from the light source with wavelength conversion, the plurality of wavelength conversion sheets including surfaces being flush with each other and adjacent edges coupled with each other;
a diffuser plate that diffuses the light from the light source, the diffuser plate being thicker than the plurality of wavelength conversion sheets and disposed on a light exit side with respect to the plurality of wavelength conversion sheets, the diffuser plate including a surface opposed to the surfaces of the plurality of wavelength conversion sheets and having an area about equal to a sum of areas of the surfaces of the plurality of wavelength conversion sheets,
a chassis holding the light source, the plurality of wavelength conversion sheets, and the diffuser plate therein, the chassis including:
a bottom plate parallel to the surfaces of the plurality of wavelength conversion sheets;
side plates extending at an angle from edges of the bottom plate; and
receiver plates extending outward from distal ends of the side plates to be parallel to the surfaces of the plurality of wavelength conversion sheets and receiving edges of the plurality of wavelength conversion sheets; and
a light reflection sheet disposed in the chassis to reflect light inside the chassis, the light reflection sheet including:
a bottom reflection portion smaller than the bottom plate and disposed on the bottom plate; and
extended reflection portions extending from edges of the bottom reflection portion toward the receiver plates, respectively, the extended reflection portions including distal ends sandwiched between the respective receiver plates and the edges of the plurality of wavelength conversion sheets.

2. The lighting device according to claim 1, wherein the plurality of wavelength conversion sheets are bonded on a plate surface of the diffuser plate on an opposite side from the light exit side.

3. The lighting device according to claim 2, further comprising an adhesive layer between the plurality of wavelength conversion sheets and the diffuser plate.

4. The lighting device according to claim 1, further comprising an optical sheet being thinner than the diffuser plate and overlapped with the diffuser plate on the light exit side.

5. The lighting device according to claim 1, wherein the diffuser plate is disposed to cover an entire area of the plurality of wavelength conversion sheets from the light exit side.

6. The lighting device according to claim 1, further comprising a second diffuser plate being thicker than the plurality of wavelength conversion sheets and overlapped with the plurality of wavelength conversion sheets on an opposite side from the diffuser plate with respect to the plurality of wavelength conversion sheets.

7. The lighting device according to claim 1, wherein the plurality of wavelength conversion sheets are disposed opposite to a light emission surface of the light source and away from the light emission surface on the light exit side.

8. The lighting device according to claim 1, further comprising a light guide plate configured to guide the light from the light source, wherein
the plurality of wavelength conversion sheets are disposed opposite a light exit surface of the light guide plate.

9. The lighting device according to claim 1, wherein
the light source is configured to emit blue light, and
the phosphors in the plurality of wavelength conversion sheets include at least a green phosphor that converts the blue light into green light through wavelength conversion and a red phosphor that converts the blue light into red light through wavelength conversion, or a yellow phosphor that converts the blue light into yellow light through wavelength conversion.

10. The lighting device according to claim 1, wherein the plurality of wavelength conversion sheets include quantum dot phosphors as the phosphors.

11. A display device comprising:
the lighting device according to claim 1; and
a display panel displaying images using light from the lighting device.

12. A television device comprising the display device according to claim 11.

* * * * *